US008422661B2

(12) United States Patent
Suzuki et al.

(10) Patent No.: US 8,422,661 B2
(45) Date of Patent: Apr. 16, 2013

(54) TERMINAL AND CONTROL PROGRAM OF TERMINAL

(75) Inventors: Toshiyuki Suzuki, Yokohama (JP); Toshihiro Azami, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 1340 days.

(21) Appl. No.: 11/559,180

(22) Filed: Nov. 13, 2006

(65) Prior Publication Data

US 2007/0135104 A1    Jun. 14, 2007

(30) Foreign Application Priority Data

Nov. 14, 2005 (JP) ................ P2005-328456

(51) Int. Cl.
*H04M 1/00* (2006.01)
(52) U.S. Cl.
USPC ............ 379/387.02; 379/433.07; 345/173; 345/168; 345/169; 345/156; 455/466
(58) Field of Classification Search .......... 345/168–179; 178/18.01–20.04; 715/773, 780, 788, 863, 715/864; 455/186.2
See application file for complete search history.

(56) References Cited

U.S. PATENT DOCUMENTS

| 5,956,021 | A | 9/1999 | Kubota et al. | |
|---|---|---|---|---|
| 6,169,538 | B1* | 1/2001 | Nowlan et al. | 345/168 |
| 2002/0000978 | A1* | 1/2002 | Gerpheide | 345/173 |
| 2002/0057259 | A1* | 5/2002 | Suzuki | 345/168 |
| 2003/0063073 | A1* | 4/2003 | Geaghan et al. | 345/173 |
| 2003/0064736 | A1* | 4/2003 | Bickerton et al. | 455/466 |
| 2004/0021696 | A1* | 2/2004 | Molgaard | 345/810 |
| 2005/0052406 | A1* | 3/2005 | Stephanick et al. | 345/156 |
| 2007/0046641 | A1* | 3/2007 | Lim | 345/173 |
| 2007/0195062 | A1* | 8/2007 | Guthrie | 345/169 |

FOREIGN PATENT DOCUMENTS

| CN | 1524212 A | 8/2004 |
|---|---|---|
| EP | 1 081 922 A2 | 3/2001 |
| JP | 2002-116862 | 4/2002 |
| JP | 2003-330614 | 11/2003 |
| JP | 2004-355606 | 12/2004 |
| JP | 2005-44339 | 2/2005 |
| JP | 2005-135101 | 5/2005 |
| WO | WO 02/095524 A2 | 11/2002 |

OTHER PUBLICATIONS

Official Action Letter issued on Jan. 4, 2011 in the counterpart Japanese Patent application with English translation.
European Search Report dated Jun. 13, 2012.

* cited by examiner

*Primary Examiner* — Duc Nguyen
*Assistant Examiner* — Ibraham Sharifzada
(74) *Attorney, Agent, or Firm* — Oblon, Spivak, McClelland, Maier & Neustadt, L.L.P.

(57) ABSTRACT

A terminal includes a key input unit having a key section and an output unit outputting information inputted by the key input unit. The terminal includes a touch detection unit which detects a touch of an object to the key section and detects a moving distance that the object moves on a surface of the key section while keeping the touch and a control unit which switches information outputted to the output unit according to the moving distance detected by the touch detection unit.

7 Claims, 28 Drawing Sheets

FIRST TOUCH TO KEY

| AREA | Xmin | Xmax | Ymin | Ymax |
|---|---|---|---|---|
| 1 | 0 | 70 | 60 | 110 |
| 2 | 80 | 150 | 60 | 110 |
| ⋮ | | | | |
| # | 160 | 230 | 300 | 350 |

SECOND TOUCH TO ADJACENT KEY

| AREA | Xmin | Xmax | Ymin | Ymax |
|---|---|---|---|---|
| 1 | 0 | 70 | 60 | 110 |
| 2 | 80 | 150 | 60 | 110 |
| ⋮ | | | | |
| # | 160 | 230 | 300 | 350 |

FIRST TOUCH TO KEY

| AREA | CHARACTER |
|---|---|
| 1 | a |
| 2 | a |
| ⋮ | a |
| # | a |

SECOND TOUCH TO ADJACENT KEY

| AREA | CHARACTER |
|---|---|
| 1 | - |
| 2 | d |
| ⋮ | d |
| # | d |

FIG. 9
(a)
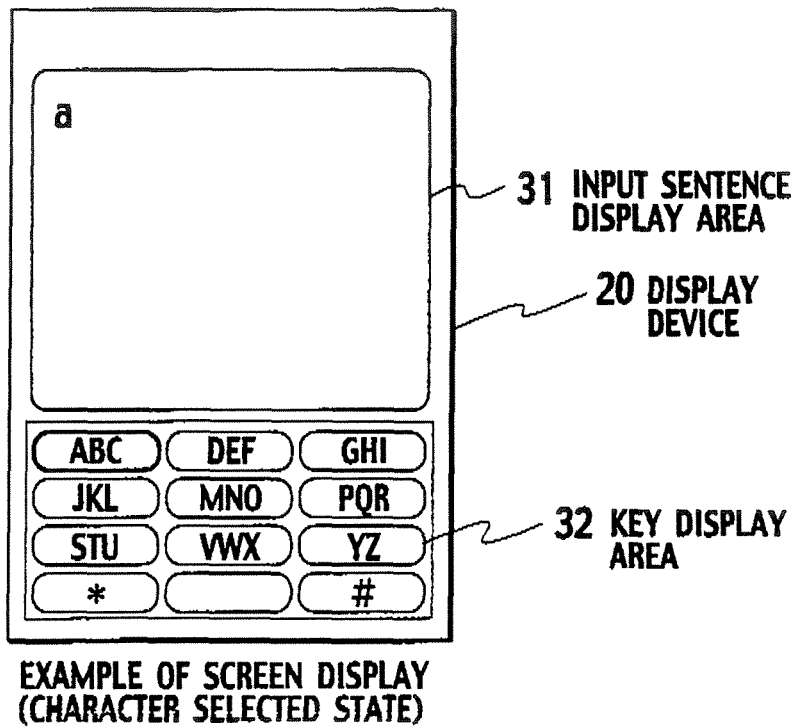
EXAMPLE OF SCREEN DISPLAY
(CHARACTER SELECTED STATE)
(b)
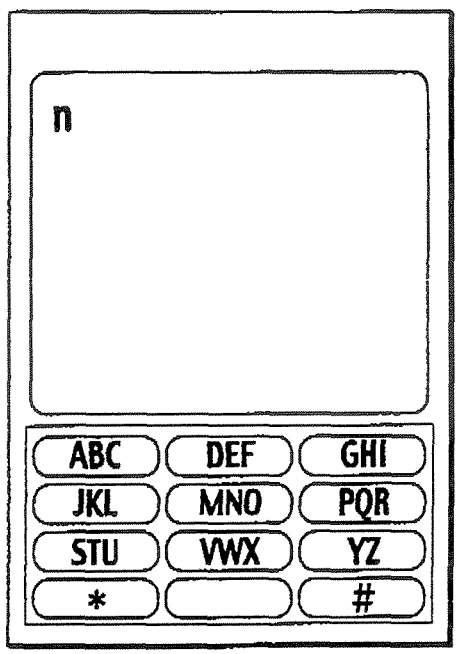
EXAMPLE OF SCREEN DISPLAY
(CHARACTER FIXED STATE)

FIG. 11
(a) 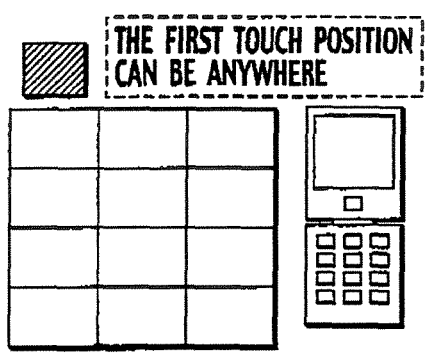
(b) 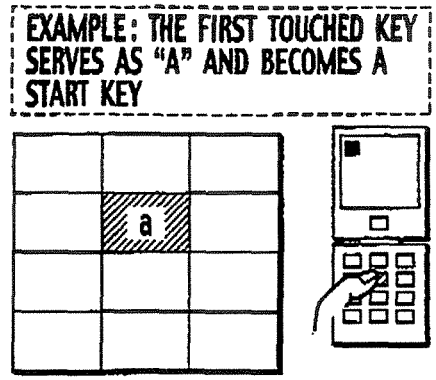
(c) DETERMINE THE LINE BY HORIZONTAL MOVEMENT
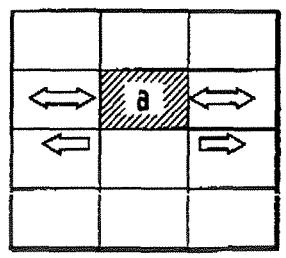
THE CHARACTER CHANGES ACCORDING TO THE TOTAL NUMBER OF KEYS ON WHICH THE FINGER SLIDES
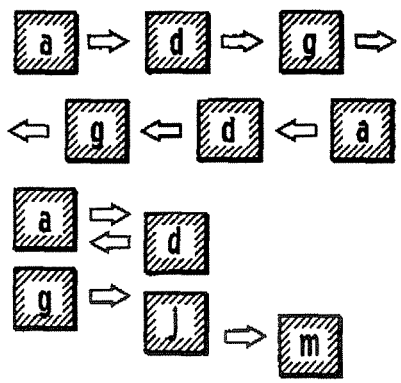
(d) DETERMINE THE RANK ACCORDING TO VERTICAL MOVEMENT
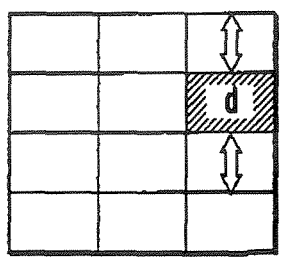
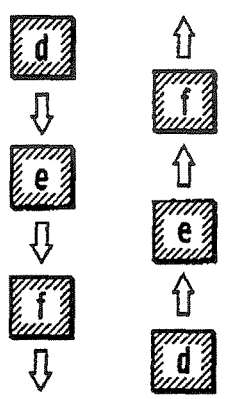

FIG. 12
EXAMPLE: MOVEMENT FOR INPUTTING "to"
(a) DETERMINE THE LINE WITH HORIZONTAL MOVEMENT
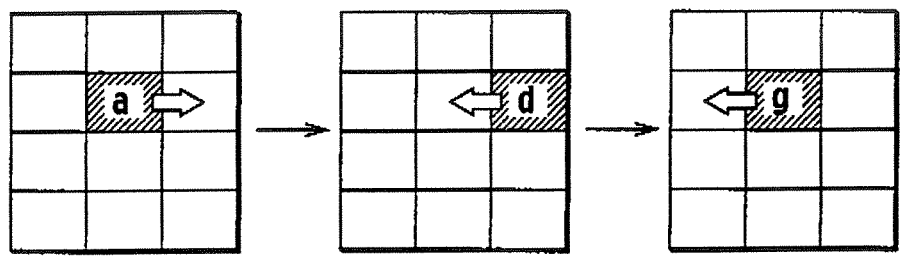
(b) DETERMINE THE RANK WITH VERTICAL MOVEMENT
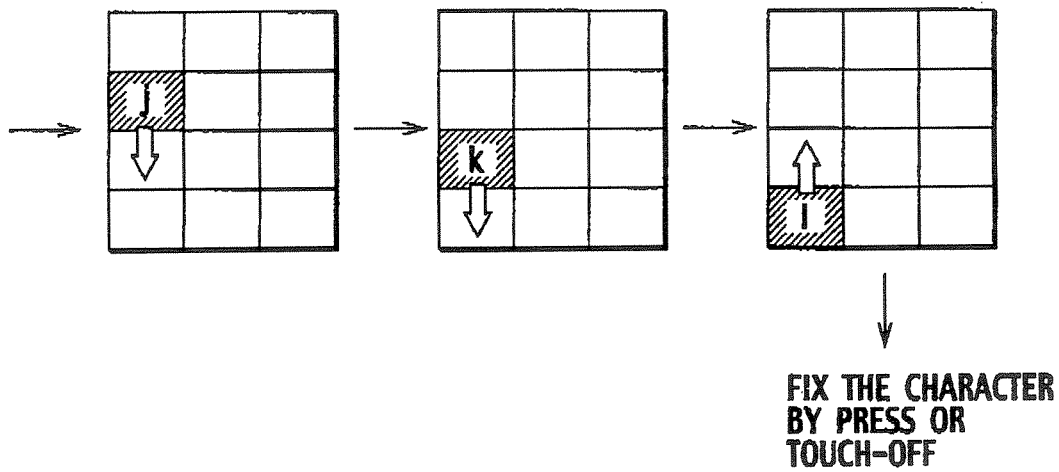
FIX THE CHARACTER BY PRESS OR TOUCH-OFF

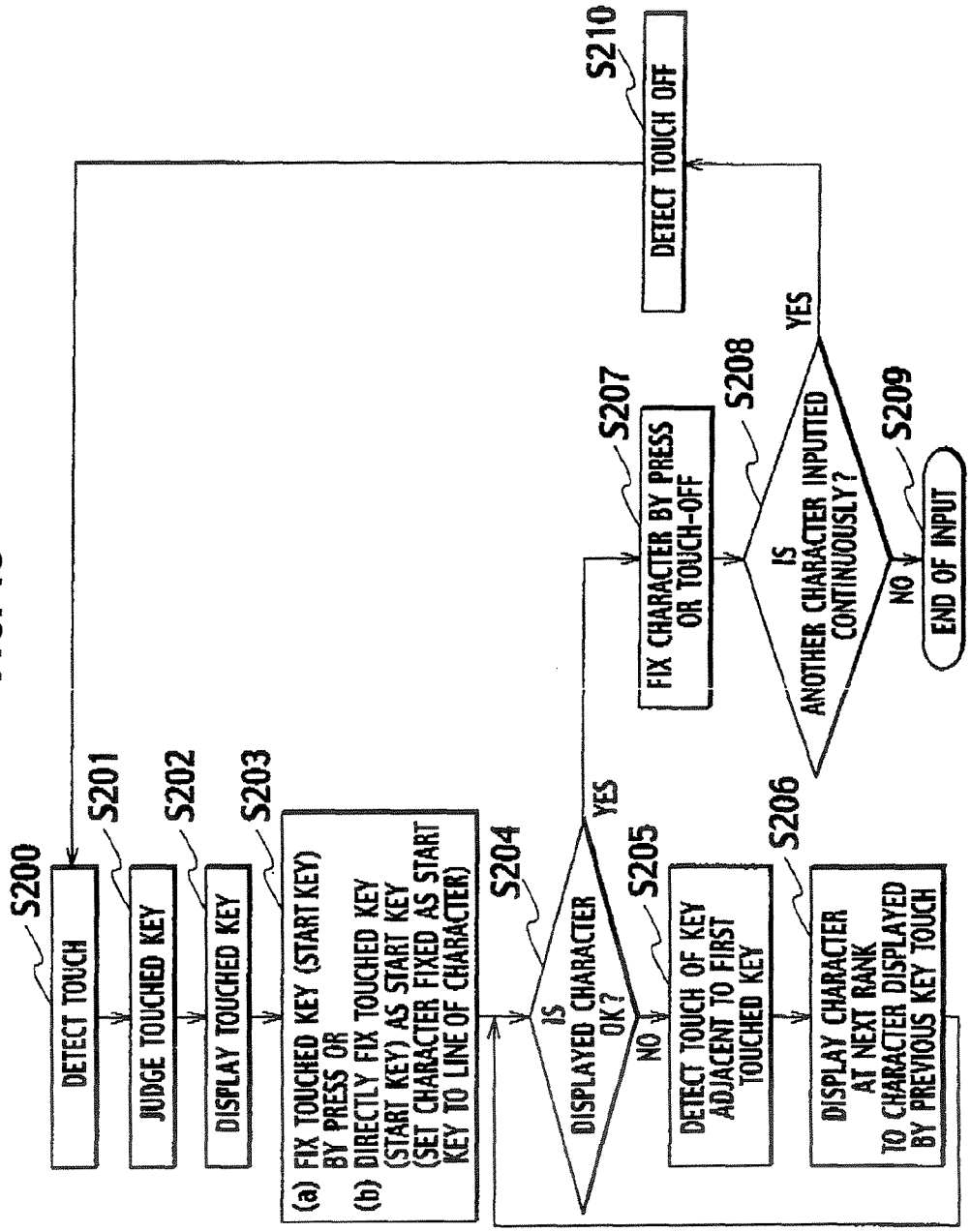

FIG. 14

(a)
FIRST TOUCH POSITION: KEY AT THE "a" RANK IN THE LINE OF DESIRED CHARACTER
(EXAMPLE) "d" KEY WHEN DESIRED CHARACTER IS "f"

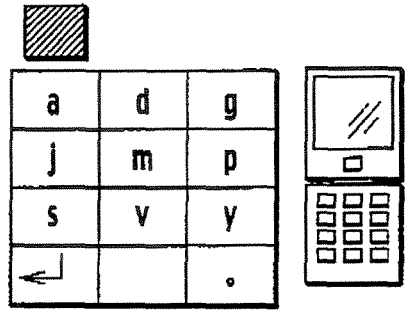

(b)
ALL THE KEYS ADJACENT TO THE FIRST TOUCHED KEY ARE THE NEXT CANDIDATE

EXAMPLE: MOVEMENT WHEN "a" KEY IS FIRST TOUCHED

EXAMPLE: MOVEMENT WHEN "d" KEY IS FIRST TOUCHE

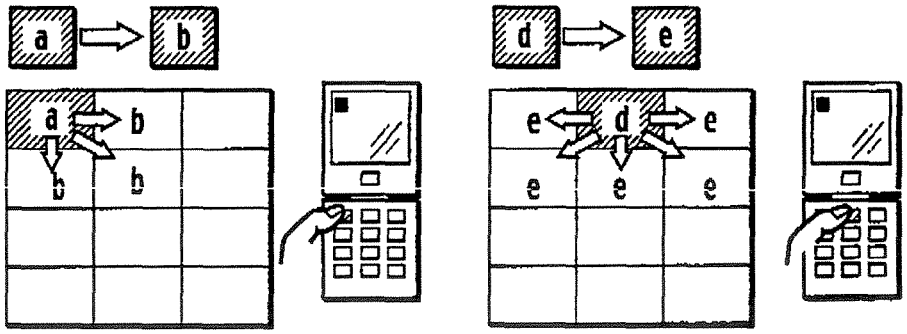

(c)
EXAMPLE: MOVEMENT WHEN DESIRED CHARACTER IS "f"

WHEN THE FINGER SLIDES WHILE TOUCHING THE KEY, THE DISPLAYED CHARACTER CHANGES LIKE d→e→f...

(d)
MAKE PRESS OR TOUCH-OFF TO DETERMINE THE CHARACTER

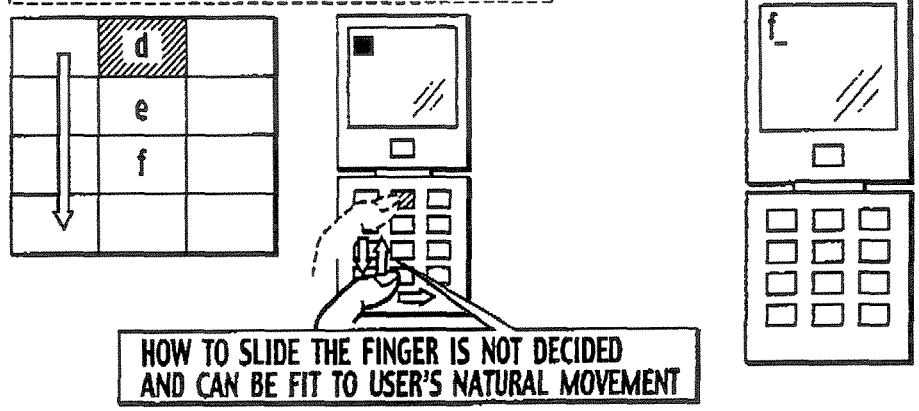

HOW TO SLIDE THE FINGER IS NOT DECIDED AND CAN BE FIT TO USER'S NATURAL MOVEMENT

FIG. 15

FIRST TOUCH TO KEY

| AREA | Xmin | Xmax | Ymin | Ymax |
|---|---|---|---|---|
| 1 | 0 | 70 | 60 | 110 |
| 2 | 80 | 150 | 60 | 110 |
| ⋮ | | | | |
| # | 160 | 230 | 300 | 350 |

↓

SECOND TOUCH TO ADJACENT KEY

| AREA | Xmin | Xmax | Ymin | Ymax |
|---|---|---|---|---|
| 1 | 0 | 70 | 60 | 110 |
| 2 | 80 | 150 | 60 | 110 |
| ⋮ | | | | |
| # | 160 | 230 | 300 | 350 |

FIG. 16

FIRST TOUCH TO KEY

| AREA | CHARACTER |
|---|---|
| 1 | a |
| 2 | d |
| ⋮ | |
| # | # |

↓

SECOND TOUCH TO ADJACENT KEY

| AREA | CHARACTER |
|---|---|
| 1 | - |
| 2 | CHARACTER AT NEXT RANK TO FIRST DISPLAYED CHARACTER EXAMPLE: "b" WHEN "a" IS FIRST DISPLAYED |
| ⋮ | CHARACTER AT NEXT RANK TO FIRST DISPLAYED CHARACTER EXAMPLE: "b" WHEN "a" IS FIRST DISPLAYE |
| # | CHARACTER AT NEXT RANK TO FIRST DISPLAYED CHARACTER EXAMPLE: "b" WHEN "a" IS FIRST DISPLAYED |

FIG. 17

(a)
THE FIRST TOUCH POSITION CAN BE ANYWHERE. CHARACTERS ARE INITIALLY GROUPED AS SHOWN IN (b)

(b)
EXAMPLE: KEYS ARE DIVIDED INTO VERTICAL LINE AREAS OF "a", "j", AND "s". THE FIRST TOUCHED KEY BECOMES A START KEY

(c) DETERMINE THE LINE WITH HORIZONTAL MOVEMENT

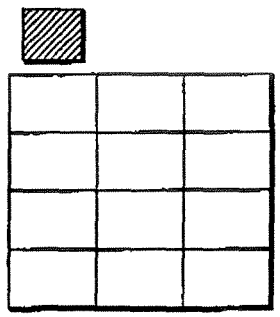

THE DISPLAYED CHARACTER IS CHANGED ACCORDING TO THE TOTAL NUMBER OF KEYS ON WHICH THE FINGER SLIDES

EXAMPLE 1 

EXAMPLE 2 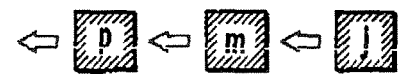

EXAMPLE 3 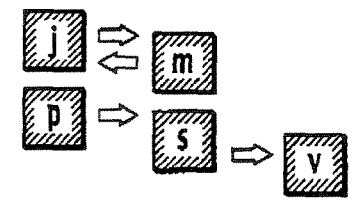

(d) DETERMINE THE RANK WITH VERTICAL MOVEMENT

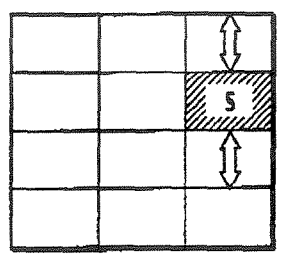

EXAMPLE 4   EXAMPLE 5 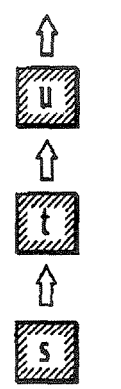  EXAMPLE 6 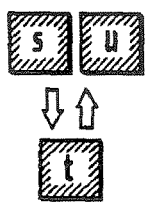

FIG. 18
EXAMPLE: MOVEMENT FOR INPUTTING "nu"
DETERMINE THE LINE
WITH HORIZONTAL
MOVEMENT
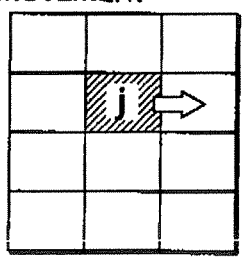 → 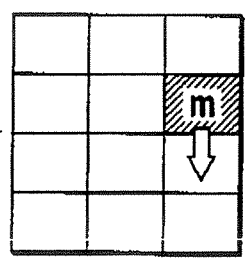 → 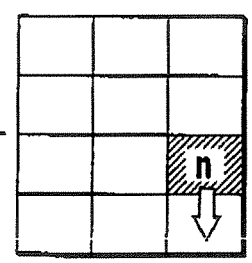
→ 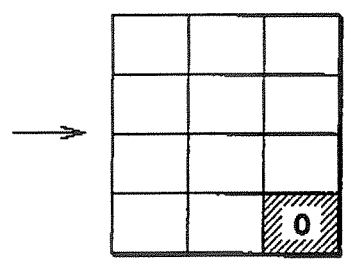 → FIX THE CHARACTER
BY PRESS OR TOUCH-OFF

FIG. 19
THE FINGER SLIDES A CERTAIN
DISTANCE IN A CERTAIN DIRECTION
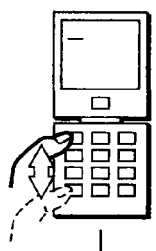
| 1~ | 10~ | 20~ |
|---|---|---|
| 30~ | 40~ | 50~ |
| 60~ | 70~ | 80~ |
| 90~ | 100~ | 110~ |
THE PAGE IS SHIFTED A LITTLE
THE SHIFT RATIO DEPENDS
ON SLIDING SPEED
OR DISTANCE
THE ENTIRE PAGE IS
AUTOMATICALLY SHIFTED
| 120~ | 130~ | 140~ |
|---|---|---|
| 150~ | 160~ | 170~ |
| 180~ | 190~ | 200~ |
| 210~ | 220~ | 230~ |
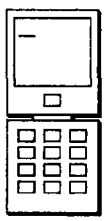
| 60~ | 70~ | 80~ |
|---|---|---|
| 90~ | 100~ | 110~ |
| 120~ | 130~ | 140~ |
| 150~ | 160~ | 170~ |
FIG. 20
LIST DISPLAY
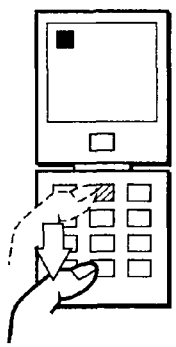
→ TO THE NEXT PAGE
THE FINGER SLIDES A CERTAIN DISTANCE
IN A CERTAIN DIRECTION FIG. 37
(a)
EXAMPLE 1
THE MODE IS AUTOMATICALLY SWITCHED TO ANOTHER MODE ACCORDING TO THE TOUCHED AREA
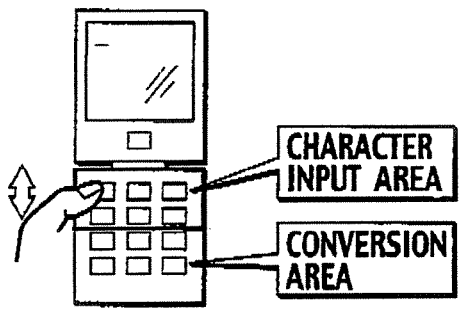
(b)
EXAMPLE 2
THE MODE IS AUTOMATICALLY SWITCHED TO ANOTHER MODE ACCORDING TO THE TOUCHED AREA
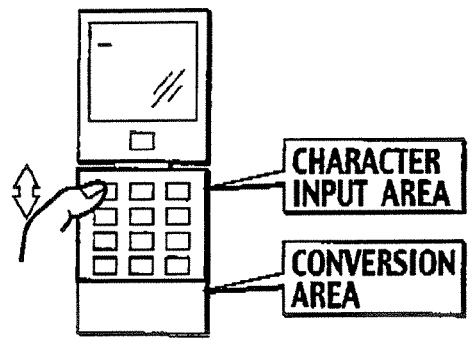
(c)
EXAMPLE 3
THE MODE IS AUTOMATICALLY SWITCHED TO ANOTHER MODE ACCORDING TO THE TOUCHED AREA
THE TOTAL NUMBER OF KEYS IS INCREASED
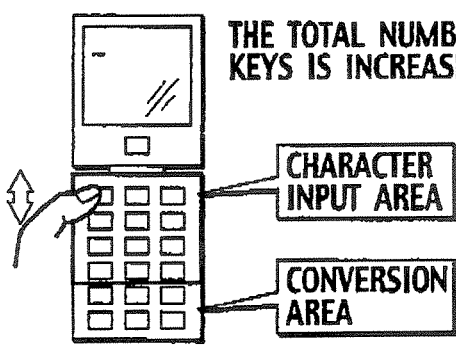

TERMINAL AND CONTROL PROGRAM OF TERMINAL

CROSS REFERENCE TO RELATED APPLICATIONS

This application is based upon and claims the benefit of priority from prior Japanese Patent Application P2005-328456 filed on Nov. 14, 2005; the entire contents of which are incorporated by reference herein.

BACKGROUND OF THE INVENTION

1. Field of the Invention

The present invention relates to a terminal to which information is input by pressing keys and a control program of the same.

2. Description of the Related Art

A general mobile phone includes function keys such as on-hook, off-hook, and menu keys in addition to twelve keys used to input a phone number, such as "0" to "9", "*", and "#". In recent years, functions of the mobile phone have been sophisticated, and a function handling Japanese phonic characters, such as a function to create or transmit emails, has become more popular. To input a phonic character in creating an email or the like, generally, the character is selected with the twelve keys, and a fixing operation is then performed. Usually, character lines in the Japanese syllabary are allocated to "0" to "9" keys, and each key is pressed several times to select one of the Japanese phonic characters. For example, usually, the "1" key is assigned to the "a" line. To input "u", the "1" key is pressed three times to sequentially select characters "a", "i", and "u", and then "u" is fixed by any fixing means. General fixing means is pressing another key. Such an input mode is called "5-touch mode".

For the 5-touch mode, a technology is disclosed to perform character selection by touch and moving directions of keys previously assigned to characters (for example, see the Japanese Patent Laid-open Publication No. 2005-44339). The technology described in the Japanese Patent Laid-open Publication No. 2005-44339 is characterized in that a movement of a pressing object which touches keys, such as a finger, from a particular key to a particular direction is assigned to displaying a particular character.

A conventional terminal, for example as shown in FIG. 1, includes a key input unit 51 such as key switches, a control unit 52 which converts a key code inputted by the key input unit 51 into a character, and an output unit 54, such as a liquid crystal display, which displays the converted character.

FIG. 2 is a control flow of the conventional terminal. When a press of a key is detected (S1001), a character allocated to the pressed key is displayed (S1002). For example, when the "1" key is pressed once, a character "a" is displayed. Herein, "a" is just selected as an input candidate and not fixed yet. A timer is started at this time (S1003). The value of the timer is previously set to, for example, one second. When the timer times out (S1004), the character allocated to the pressed key is fixed as an input character (S1005). For example, in a state where "a" is selected as the input candidate, "a" is fixed as the input character when the timer times out. In the step S1004, when a key is pressed before timeout (S1006) and the pressed key is the same as the previously pressed key (S1007), the selected character is not fixed, and a key pressed state is continued (S1008). For example, when the "1" key is pressed in a state where "a" is selected as the input candidate, "i", which is a character in a next rank of the same line, is displayed (S1002) and becomes the input candidate. In the step S1007, when the pressed key is different from the previously pressed key, the character allocated to the previously pressed key is fixed as the input character (S1008), and the key pressed state is continued (S1009). For example, it is assumed that the "2" key is pressed in a state where "a" is selected as the input candidate. At the time when the "2" key is pressed, "a" is decided as the input character. The key pressed state is then continued, and "ka" is displayed in the step S1002 and becomes the input candidate.

Taking an input of "ie" as an example, with the above 5-touch mode, "i" and "e" are selected using only the same "1" key. However, fixing "i" requires pressing another key, and an additional finger movement is required only for such fixing. In other words, to reach a target character with the 5-touch mode, some characters at the "e" and "o" ranks and the like require continuous four or five presses, which is inconvenient.

In order to prevent this, there is another method in which, "i" is automatically fixed within a certain period of time, for example, within one second after "i" is selected. However, this method requires waiting a certain period of time, and accordingly, the input operation cannot be quickly carried out.

Moreover, in the 5-touch mode, characters are previously allocated to the respective fixed keys, and the sequence of operations to reach a certain character is therefore fixed. Accordingly, it is impossible to optimize differences in operation feeling and fatigue due to dominant arms, finger's length, and the like so as to fit to each user.

Furthermore, according to the technology described in the aforementioned Japanese Patent Laid-open Publication No. 2005-44339, since a plurality of characters are allocated to a same key, looking for a character takes a lot of trouble. Moreover, moving directions of each key are assigned to respective fixed characters. It is therefore difficult for the user to instantly know which direction to move the key.

The aforementioned problems are not necessarily specific to inputting characters and are relevant to an input method with a plurality of characters allocated to a same key.

In the light of the aforementioned problems, an object of the present invention is to provide a terminal including an interface suitable for each user with the input simplified and input time shortened and a control program of the terminal.

SUMMARY OF THE INVENTION

A first aspect of the present invention is to provide a terminal including a key input unit having a key section and an output unit outputting information inputted by the key input unit, the terminal including: (A) a touch detection unit which detects a touch of an object to the key section and detects a moving distance that the object moves on a surface of the key section while keeping the touch; and (B) a control unit which switches information outputted to the output unit according to the moving distance detected by the touch detection unit.

A second aspect of the present invention is to provide a control program of a terminal including a key input unit having a key section and an output unit outputting information inputted by the key input unit, the program causes the terminal to execute the sequences of: (A) detecting a touch of an object to the key section and detecting a moving distance that the object moves on a surface of the key section while keeping the touch; and (B) switching information outputted to the output unit according to the moving distance detected by the touch detection unit.

BRIEF DESCRIPTION OF DRAWINGS

FIGS. 9A and 9B are examples of a screen display of the terminal according to the first embodiment.

FIG. 11 is a view for explaining the method of controlling the terminal according to the first embodiment.

FIG. 12 is a view for explaining the method of controlling the terminal according to the first embodiment.

FIG. 13 is a flowchart showing a method of controlling a terminal according to a second embodiment.

FIG. 14 is a view for explaining the method of controlling the terminal according to the second embodiment.

FIG. 15 is an example of a key area table of the terminal according to the second embodiment.

FIG. 16 is an example of a key registration table of the terminal according to the second embodiment.

FIG. 17 is a view for explaining the method of controlling the terminal according to the second embodiment.

FIG. 18 is a view for explaining the method of controlling the terminal according to the second embodiment.

FIG. 19 is a view for explaining a method of controlling a terminal according to a third embodiment.

FIG. 20 is a view for explaining the method of controlling the terminal according to the third embodiment.

FIG. 37 is a view for explaining the method of controlling the terminal according to the seventh embodiment.

DETAILED DESCRIPTION OF THE INVENTION

Figure 1:
FIG. 1 is a block diagram of a conventional terminal.
Figure 2:
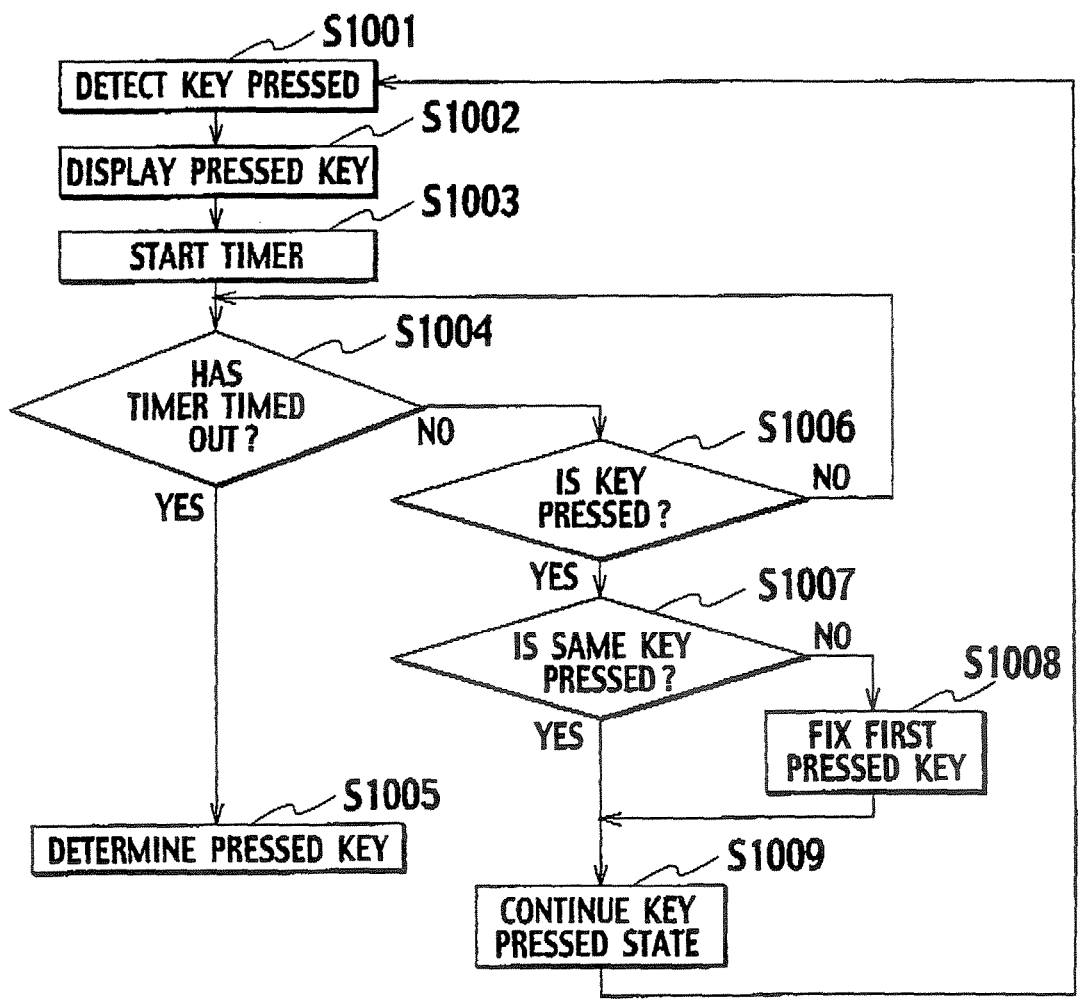
FIG. 2 is a flowchart showing a method of controlling the conventional terminal.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

<First Embodiment>

(Terminal Configuration)

Figure 3:
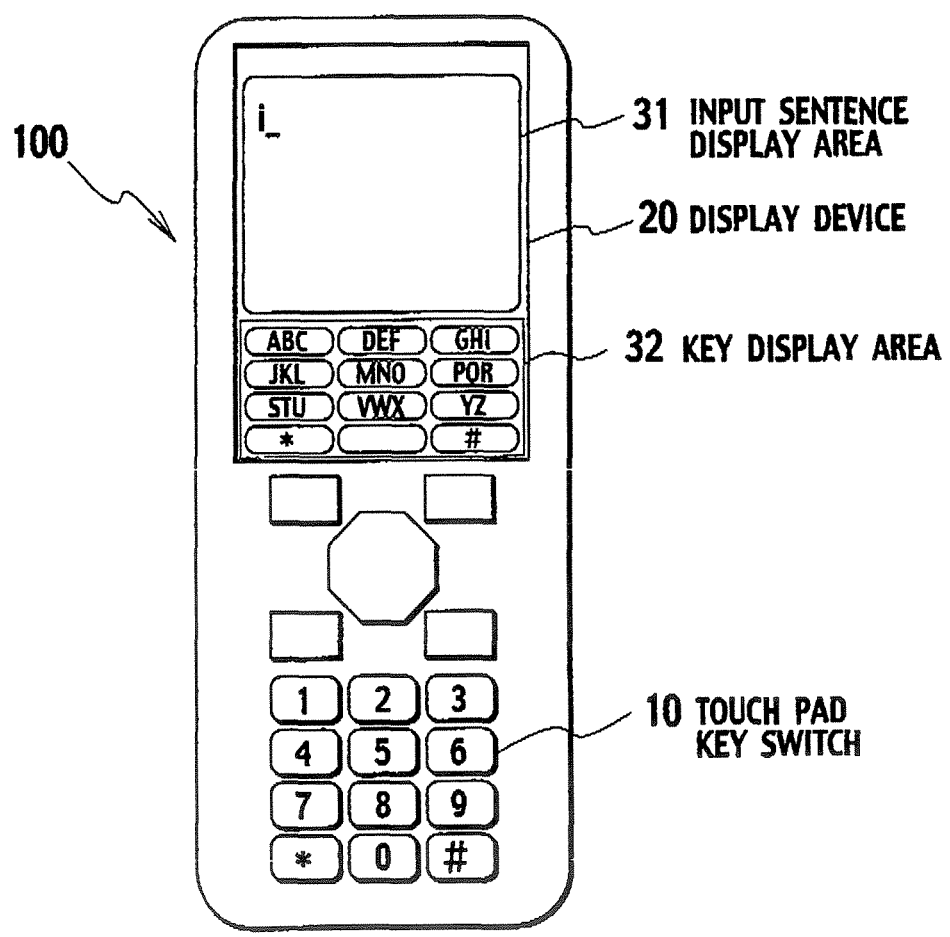
FIG. 3 is an example how to use a terminal according to a first embodiment.

A description is given of a configuration of a terminal according to this embodiment of the present invention with reference to FIG. 3.

FIG. 3 shows an example of how to use a terminal 100 including a touch pad-key switch 10 and a display device 20. This example shows a state of a mobile phone as a character input function where the plural alphabets are displayed in a key display region 32 of the display device 20 as characters allocated to respective keys.

A touch pad is attached to a key switch section. The upper part of the display screen displayed in the display device 20 is an input sentence display region 31, and the lower part thereof is a key display region 32 The key display region 32 displays that character is allocated to which key. Furthermore, when the touch pad detects a touch to the key switch, the key display region 32 is capable of showing an operator which key the operator is touching using highlighting display, such as reversing display, of a corresponding one of the characters displayed in the key display region 32.

FIG. 3 shows a state where alphabets are inputted using twelve keys of "0" to "10", "*", and "#". In FIG. 3, inputted characters "i" is displayed, and the terminal 100 is waiting for an input of the next character. For example, the "A, B,C" are allocated to the "1" key; the "D,E,F" like are allocated to the "2" key; the subsequent lines are sequentially allocated to the respective keys, and the "Y,Z" are allocated to the "9" key. And, "a" line means alphabets allocated to the "1" key. For example, "a" line is "a", "b", and "c" in FIG. 3. Similarly, "d" line means alphabets allocated to the "2" key.

Figure 4:
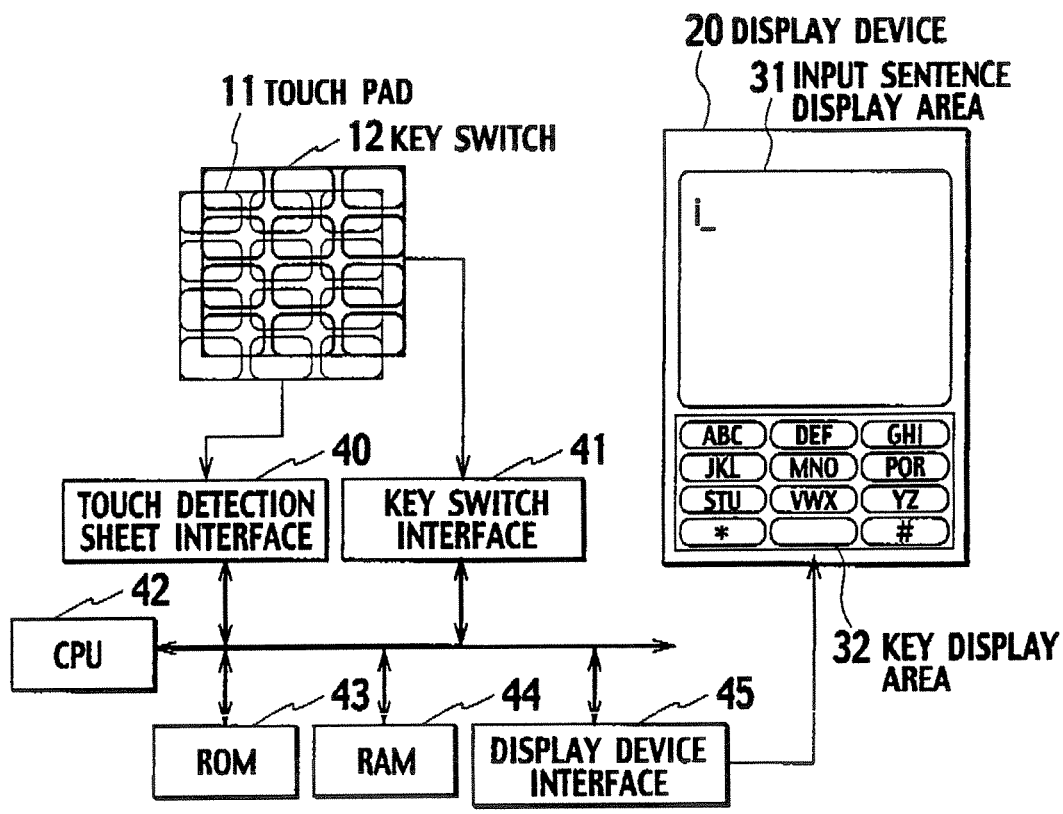
FIG. 4 is an example of a hardware configuration of the terminal according to the first embodiment.

FIG. 4 shows an example of a hardware configuration of the terminal 100 including the touch pad key switch 12, which is a target of the present invention. The terminal 100 includes a touch pad 11, a key switch 12, and a display device 20 as user interface devices. The touch pad 11 is overlapped on the key switch 12. These user interface devices are individually connected a bus of a CPU 42, which controls the terminal 100, through respective interface circuits (a touch pad interface 40, a key switch interface 41). The CPU bus is also connected to a display device interface circuit 45 so that the input sentence display region 31 or key display region 32 are displayed on the display device 20.

Figure 5:
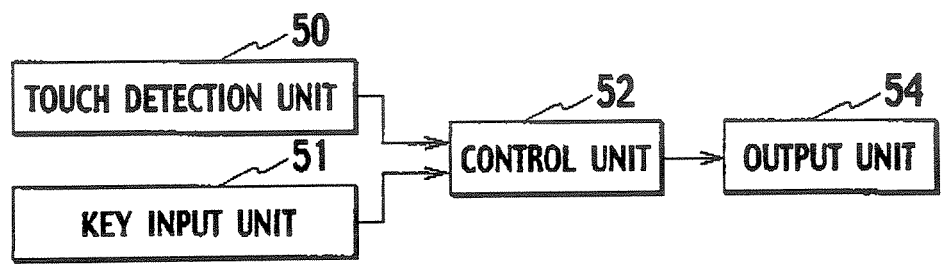
FIG. 5 is a block diagram of the terminal according to the first embodiment.

As shown in FIG. 5, the terminal loo according to the first embodiment includes a key input unit 51 including a key section, an output unit 54 outputting information inputted by the key input unit 51, a touch detection unit 50, and a control unit 52.

Herein, the "touch" means a state where a key is touched but not pressed. The "pressing state" means a state where the key is pressed down, which corresponds to a so-called "click state". Accordingly, an operation of pressing a key and then releasing the same proceed according to the following steps:

(1) a state where the key is not touched -> the touch is off while the pressing state is off;
(2) the key is touched -> the touch is on while the pressing state is off;
(3) the key is pressed -> the touch is on while the pressing state is on;
(4) the key is not pressed but touched -> the touch is on while the pressing state is off; and
(5) the hand is released from the key -> the touch is off while the pressing state is off.

Moreover, a "moving distance" indicates a distance that an object moves. The "moving distance" may be calculated as the number of keys on which the object moves. The "output unit" may be screen display output, audio output, and the like.

The touch detection unit 50 detects the object such as a finger or a pressing member touching the key section when an operator performs input with the keys. When the object moves on the surface of the key section while touching the same, the touch detection unit 50 detects the moving distance and moving direction thereof.

The control unit 52 changes information outputted to the output unit 54 according to the moving distance and direction detected by the touch detection unit 50. Moreover, upon the touch detection unit 50 detecting a touch or press of a key, the control unit 52 allocates a touch to keys adjacent to the key of interest to an event to display a next candidate key for selection. Furthermore, upon the touch detection unit 50 detecting a vertical or horizontal movement of the object on the key section surface, the control unit 52 selects a line of an output character according to the moving distance. Upon the touch detection unit 50 detecting that the horizontally moving object begins to move vertically or that the vertically moving object begins to move horizontally, the control unit 52 determines the line of the output character according to the moving distance.

As shown in FIG. 4, the terminal 100 according to the first embodiment includes a processing controller (CPU) and may be configured to cause the touch detection unit 50, key input unit 51, control unit 52, and the like to function as modules. These modules can be implemented by execution of a dedicated program for use of a predetermined program language in a general-purpose computer such as a personal computer.

The terminal 100 may include a recording medium storing programs to execute the functions of the control unit 52 and the like. Examples of the recording medium are a hard disk, a flexible disk, a compact disk, an IC chip, a cassette tape, and the like. With such recording medium storing the programs, the programs can be easily saved, delivered, and sold.

(Terminal Control Method)

Figure 6:
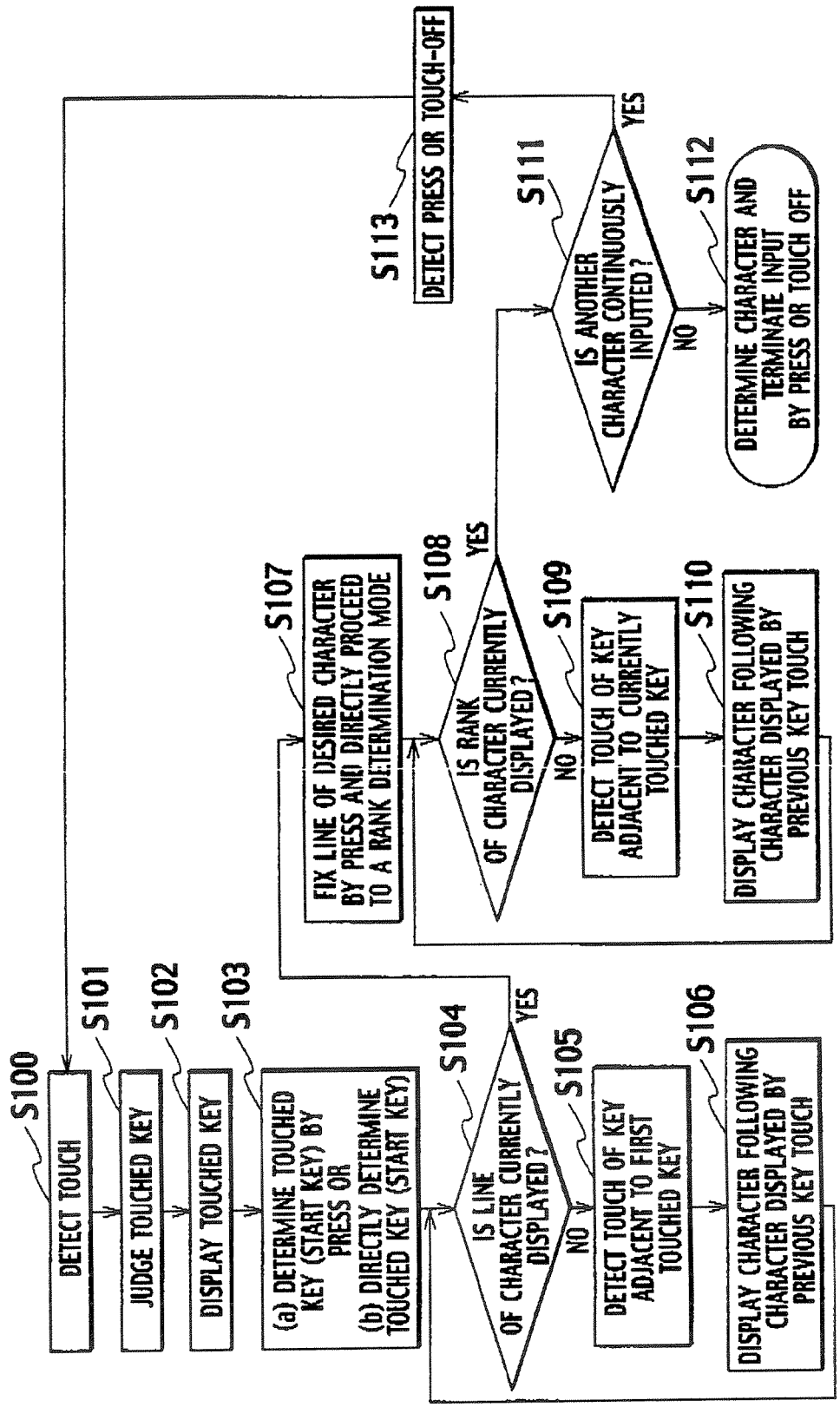
FIG. 6 is a flowchart showing a method of controlling the terminal according to the first embodiment.

Next, a description is given of a method of controlling the terminal according to the first embodiment using FIG. 6. Steps in the control method of the terminal correspond to respective procedures executed by a control program of the terminal. Herein, the description is given of the method of controlling the terminal in which the line and rank of the input character are selected by horizontal and vertical slide movements of the object keeping the touch starting from any key which the object has first touched.

Figure 7:
FIG. 7 is an example of a key area table of the terminal according to the first embodiment.
Figure 8:
FIG. 8 is an example of a key registration table of the terminal according to the first embodiment.

When the touch pad 11 detects a touch (S100), it is judged which key the touch is made for (S101), a selected character is displayed in the input sentence display region 31 on the display screen (S102). The judgment uses a key area table and a key registration table respectively shown in FIGS. 7 and 8. The key area table shown in FIG. 7 is a table used to manage which touch position corresponds to which key area. According to FIG. 7, the area of the "1" key has X coordinates ranging from 0 to 70 and Y coordinates ranging from 60 to 110. The key registration table shown in FIG. 8 is a table used to manage which key is assigned to which function or character. According to FIG. 8, the "1" key is assigned to the character "a". Furthermore, the individual keys are not assigned to different characters. Accordingly, any key which is touched first is assigned to "a". This is an example of the case where settings are made so as to start with "a" whichever key is touched.

FIG. 9A shows an example in which the judged key (step S101 in FIG. 6) is indicated by highlighting such as reversing display (step S102 of FIG. 6) on the display screen together with the state of the character "a" being selected. Herein, the character "a" is underlined to indicate the selected state thereof. Moreover, in the key display region 32, the key indication of the "a" line is colored to indicate that the key of the "a" line is touched.

When a press of the key is detected (S103 (a)), the terminal 100 goes into a mode of selecting a character by sliding a finger starting from the pressed key as a start key, that is, starting from "a". When a touch of the key is detected (S103 (b)), that is, when the key is touched for the first time and is not pressed, the touched key may be configured to automatically become the start key for display of "a".

After the start key is determined, when the character currently displayed is appropriate (YES in S104), the line is fixed (S107). When a character other than the character currently displayed by the start key is desired to be displayed (No in S104), the finger is slid to a key adjacent to the "1" key currently touched, for example, the "2" key, while keeping the touch (S105). At this time, when the terminal 100 follows the tables shown in FIGS. 7 and 8, a character candidate next to "a", for example, the character "d" in the "d" line next to the "a" line, is displayed (S106). In a similar way, when the finger is further slid to the adjacent key, for example, the "3" key, "g" is displayed. In a similar way, the displayed character changes to "j", "m" . . . When the line of the desired character is selected, the line is fixed by any fixing event, for example, a "press" of the key (S107). For example, the line is fixed when "m" is displayed.

When the rank of the desired character is not currently displayed (S108), the finger is further slid continuously to the adjacent key (S109) to change the rank of the displayed character up to the rank of the desired character for selection (S110). The selected rank is fixed by a fixing event such as a press. Herein, "rank" means alphabets allocated to one line. For example, "b" and "c" are the rank of "a" line.

When another character is desired to be continuously inputted (YES in S111) in a state where the rank of the desired character is currently displayed (YES in S108), a press or touch-off is made (S113). When another character is not desired to be continuously inputted (NO in S111), a press or touch-off is made to fix the character and terminate the process (S112). For example, the displayed character is changed like m ->n (S110) for selection of the desired character. Subsequently, the selected character is fixed by any fixing event, for example, a "press" of the key (S112 or S113). FIG. 9(*b*) shows a state where the "n" is fixed with the underline of "n" removed. In the steps S107, S112, and S113, when the touch-off or press is not detected, the selected character is not fixed.

When the next character is desired to be continuously inputted after a character is determined, an arbitrary key is touched again, and the input operation is similarly conducted from the step S100. A desired string can be thus eventually inputted.

The control unit 52 can control which character is allocated to the first touch. The above description is an example of a case where "a" is displayed by the first touch.

Figure 10:
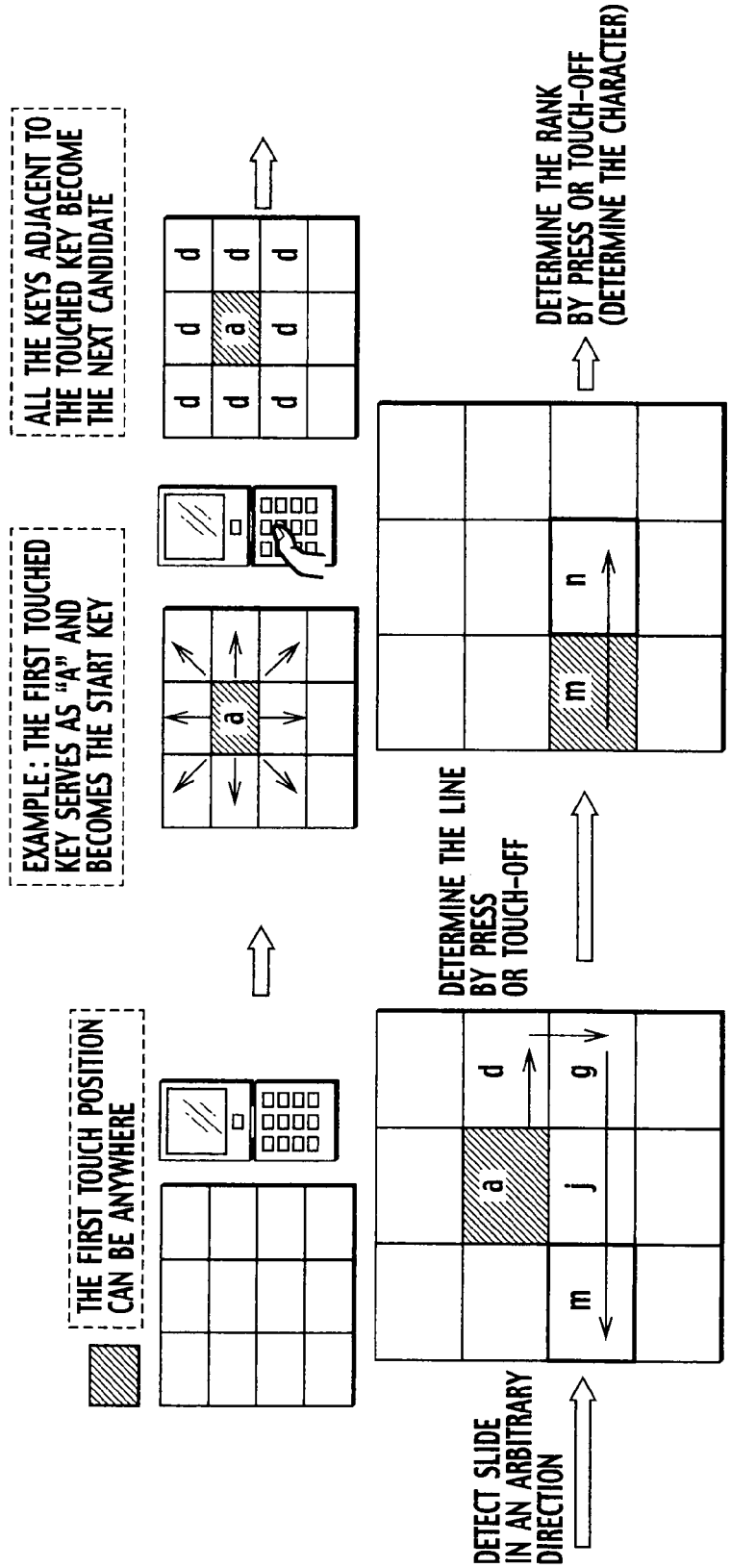
FIG. 10 is a view for explaining the method of controlling the terminal according to the first embodiment.
Figure 21:
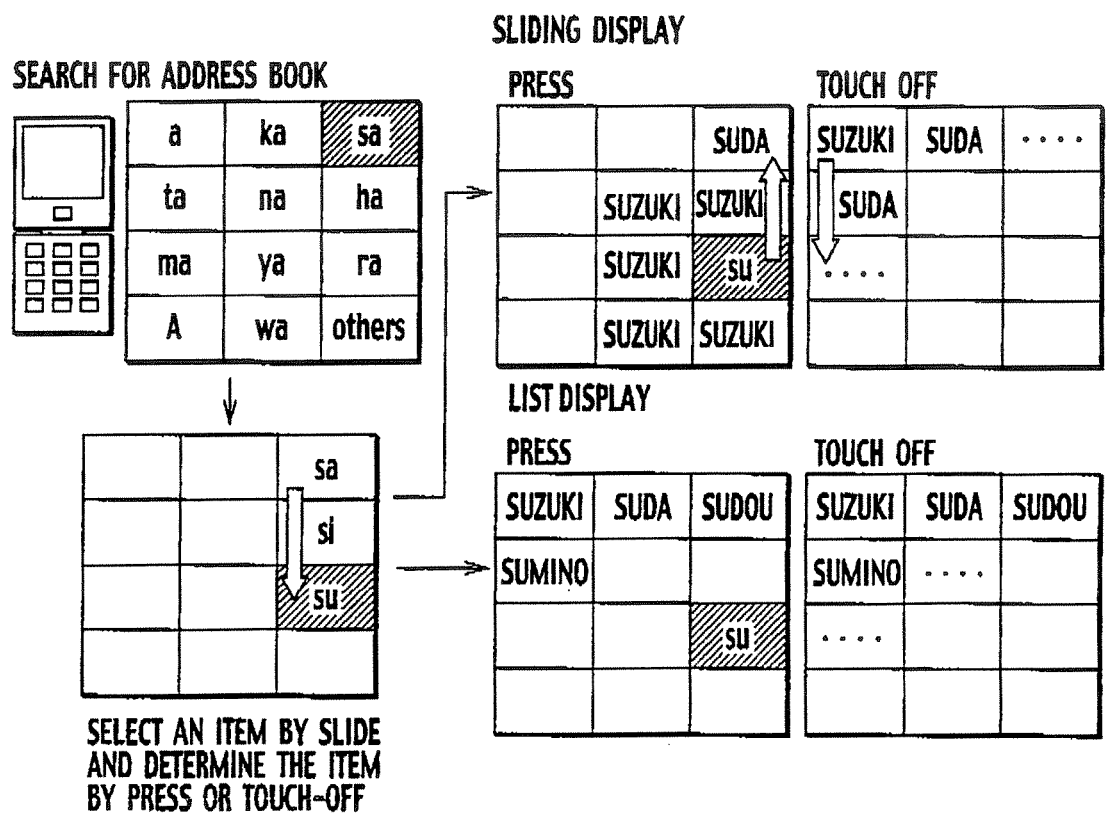
FIG. 21 is a view for explaining the method of controlling the terminal according to the third embodiment.

FIG. 10 shows a flow of operations and a screen transition example in the method of controlling the terminal according to the first embodiment. As shown in FIG. 10, the key first touched can be any one of the keys, and all the keys adjacent to the touched key become next character candidates. The operation flow to determine the character includes: touching a key; sliding a finger to select the line; make a press or touch-off to fix the line; sliding a finger to select the rank; and making a press or touch-off to fix the rank (to fix the character).

Another operation flow and the screen transition example thereof in the method of controlling the terminal according to the first embodiment are shown in FIG. 11. The basic flow of inputting a character is the same as that shown in FIGS. 10((*a*) and (*b*) of FIG. 11). Different points are that: the character line is selected when a horizontal slide is made with respect to the entire keys after the start key is fixed. Upon subsequent detection of a change from the horizontal slide to a vertical slide, the line displayed at that time is fixed ((c) of FIG. 11), and simultaneously, the rank is selected by the vertical slide ((d) of FIG. 11).

Specifically, as shown in FIG. 12, in the case of inputting "l", after the start key is fixed, the "j" line is selected by a horizontal slide with respect to the entire keys ((a) of FIG. 12). Upon subsequent detection of a change from the horizontal slide to a vertical slide, the "j" line displayed at that time is fixed ((b) of FIG. 12), and simultaneously, "l", is selected by the vertical slide ((d) of FIG. 12). The rank, or the character "l", is then fixed by a press or touch-off.

The horizontal and vertical movements for selecting the line and rank may be otherwise. Specifically, the character line is selected when a vertical slide is made with respect to the entire keys after the start key is fixed. Upon subsequent detection of a change from the vertical slide to a horizontal slide, the character line displayed at that time is fixed while the character rank is selected by the horizontal slide.

The control program of the terminal means an application capable of controlling all or part of the functions. For example, the control program can control which character is allocated to the first touched key and displayed. In the case of inputting a character, it is thought convenient that the top of one of the character lines such as "a" is assigned to the first touch.

Moreover, the control program of the terminal can control a later-described way of inputting the character line and rank and allocation of the characters in terms of the direction of the slide.

Furthermore, the control program of the terminal can adjust the rate of change in display according to, for example, the slide distance or the number of keys on which the finger slides in the entire keys.

For example, in the case of adjusting the rate of change by the slide distance, the displayed character may be changed from "a" to "b" either by a slide of 5 mm or by a slide of 10 mm from certain coordinates to different coordinates, which is adjustable. Moreover, the adjustment maybe configured so that the character is changed from "a" to "b" by a slide of 5 mm or changed from "a" to "c" so as to jump "b" by the same slide of 5 mm.

For example, in the case of adjusting the rate of change by the number of keys, the displayed character may be changed from "a" to "b" by a slide of one key, by a slide of two keys, or by a slide of 1.5 keys, which is adjustable. Moreover, the adjustment can be configured so that the character is changed from "a" to "b" by a slide of one key or changed from "a" to "c" so as to jump "b" by the same slide of one key.

In this embodiment, since the change in display is controlled according to the distance or the number of keys of the slide, the rate of change in the displayed character is proportional to the sliding speed of the finger.

(Effects)

With the terminal according to the first embodiment, the method of controlling the same, and the control program of the same, since characters are not previously allocated to the keys or screen, the operator does not need to search for allocated characters. Moreover, the display changes in conjunction with the movement of the operator's finger, and it is therefore possible to provide an input operation easily understood by the operator. Furthermore, there is not need to previously allocate characters to the positions of keys or moving directions of the finger. Accordingly, it is possible to provide a user interface suitable to the operator's own characteristics such as operator's dominant arm, habits, and finger length.

Moreover, characters can be inputted by moving the finger in arbitrary directions, and the moving direction of the finger is not limited.

Moreover, since continuous movement can be performed more quickly by the slide operation than by the press operation, time required to input a character can be shortened. The number of key presses can be also reduced. It is thought that fatigue and stress due to the slide operation are less than those due to the press operation. The press operation requires quick large force, and inputting some characters require a plurality of presses. For example, with the 5-touch mode, inputting characters at the "o" rank requires five presses. On the other hand, the slide operation requires less force. Moreover, the slide operation is a single event no matter how long the finger slides (like writing without lifting a pen). Accordingly, the time required to input a character can be shortened.

Moreover, since a character is inputted by a slide in an arbitrary direction, at inputting a character, the operator does not need to confirm matching of the finger and the key position and only needs to confirm the display on the screen. Accordingly, movements of the line of sight to the keys can be reduced, thus increasing input speed.

Moreover, the operator does not look for a character allocated to a key but directly selects the character with a movement of his/her own finger. Accordingly, the operator can easily reach the desired character.

Moreover, the operator has a feeling like not searching for the desired character but creating the character, which is easy to understand.

Moreover, the operator does not need to confirm characters allocated to the respective keys. For example, the key first touched is assigned to a specific character, for example, "a".

Moreover, the operator can customize the pattern of switching characters according to slide movements (for example, the character line is selected by a horizontal slide while the character rank is selected by a vertical slide), the pattern of characters allocated to the respective keys (in which, for example, allocation of characters to the keys is eliminated, and the first touched key is assigned to "a"; characters are assigned like a normal numeric keyboard; or the keys are divided into a vertical lines, and different characters are assigned to the respective vertical lines; and the like).

The first embodiment further has an effect on an increase in certainty of the key operation by showing a touched key in the key display region 32. For example, even when print of the keys cannot be seen enough in a dark place, the operator searches for keys and knows which key the operator is touching, thus carrying out a sure key press. Moreover, when a key is assigned to a function whose name is too long to print thereon, the function can be shown on the screen by software.

The terminal may be configured so that upon detection of a vertical or horizontal movement of an object on the key section surface, the line of the outputted character may be determined according to the moving distance thereof and upon detecting that the object having moved vertically begins to move horizontally or that the object having moved horizontally begins to move vertically, the rank of the outputted character is determined according to the moving distance thereof. In such a case, the character line can be determined only by the slide, and subsequently the character rank can be determined without another event such as a touch-off or press.

<Second Embodiment>

In the first embodiment, characters are not allocated to the respective keys. On the other hand, in a second embodiment, a description is given of a case where characters are allocated to respective keys or respective portions of the key section.

(Terminal Configuration)

As shown in FIG. 5, a terminal according to the second embodiment includes the key input unit 51 having the key section; the output unit 54 outputting information inputted by the key input unit 51; the touch detection unit 50; and the control unit 52.

In the terminal according to the second embodiment, characters are allocated to respective keys or respective portions of the key section.

The control unit 52 outputs a character allocated to a key detected by the touch detection unit 50 to the output unit 54.

The other configuration is the same as that of the terminal according to the first embodiment, and the description thereof is omitted here.

(Terminal Control Method)

Next, a description is given of a method of controlling a terminal according to the second embodiment using FIG. 13. Steps of in the method of controlling the terminal correspond to respective procedures executed by a control program of the terminal.

The second embodiment is an example of a case of allocating different characters to the respective keys. The different point from the first embodiment is that all the keys are individually assigned to different characters in advance. In other words, each character is allocated to a single key or an area including a plurality of keys. For example, as shown in (a) of FIG. 14, when keys corresponding to 1, 2, 3, 4, 5, . . . are respectively assigned to "a", "d", "g", "j", "m", . . . in advance, touching one of the keys means selecting a corresponding line ((b) of FIG., 14)). The character is changed by a subsequent slide of the finger ((c) of FIG. 14) and then determined by a press or touch-off ((d) of FIG. 14). A description is given of a process in the control unit when characters are allocated like a general key arrangement as shown in (a) of FIG. 14 according to the flow of FIG. 13.

Upon detection of a touch by the touch pad (S200), the control unit judges which key the touch is made for (S201) and displays a selected character in the input sentence display area on the display screen (S202). The judgment uses a key area table and a key registration table respectively shown in FIGS. 15 and 16. The key area table shown in FIG. 15 is a management table used to manage which touched position corresponds to which key area. According to FIG. 15, the area of the "1" key has x coordinates ranging from 0 to 70 and Y coordinates ranging from 60 to 110. The key registration table shown in FIG. 16 is a table used to manage which key is currently assigned to which function or character. For example, the "1" key is assigned to the character "a", and the "2" key is assigned to the character "d". The key judged in the step S201 of FIG. 13 is highlighted and displayed by reversing display or the like on the display screen (S202) together with the state where "a" is selected.

In this state, when a press of a key is detected (S203(a)), the key becomes the start key, and the terminal goes into a mode of selecting a character with a slide from the character allocated to the pressed key. When a touch of a key is detected (S203(b)), the touched but not pressed key automatically becomes the start key at the first touch, and the character allocated to the touched key is displayed. The line assigned to the start key is directly fixed as the line of the desired character. For example, when it is assumed that the "1" key is currently being touched, the "a" line is selected and then fixed directly or by a press. Subsequently, when the finger slides while keeping the touch and touches the adjacent key, for example, the "2" key, the rank of the "a" line begins to change (S204 and S205). For example, since the character at the next rank to the "a" in the "a" line is "b", "b" is displayed (S206). In a similar way, when the finger further slides and touches the adjacent key, for example the "3" key, the displayed character is changed to "c". When the rank of the desired character is selected, a touch-off or press is then made to fix the character (S207). When a touch-off or press is not detected in the step S204, the selected character is not fixed.

To subsequently input another character (S208 and S210), the key assigned to the line of the desired character is touched (S200) in the similar way to the initial operation in inputting the first character, and the character is then determined in the similar way. A desired string is thus eventually inputted.

As for characters made corresponding to respective keys, the control unit can control which key to be assigned to which character. The second embodiment is described with an example of the case where the key area 1 is first touched to display "a" as shown in FIGS. 15 and 16.

FIG. 17 shows a flow of the operations and a screen transition example in the method of controlling the terminal according to the second embodiment. In the second embodiment, the keys are individually assigned to different characters (at the top ranks of the "a", "d", "g", "j" . . . , lines). Alternatively, each character may be allocated to an area of a set of a plurality of keys in a vertical or horizontal line or a specific set area including some keys. In a similar way to the first embodiment, the line and rank may be determined with horizontal and vertical movements, respectively, or may be determined with vertical and horizontal movements, respectively.

In FIG. 17, a description is given of a character assignment in which a plurality of keys are divided into areas corresponding to the vertical lines and a same character is allocated to each area. In this method, the line and rank of the displayed character are changed by the directional characteristic of slide. In the directional characteristic described here, the line and rank are determined by horizontal and vertical slides, respectively. Specifically, in the above character assignment, all the keys are divided into the vertical lines, and a same character is allocated to keys in each of the areas of the vertical lines. A first pressed key becomes the start key, and the desired line and rank are selected starting from the character allocated to the start key.

As shown in (b) of FIG. 17, the vertical lines are assigned to respective characters and made corresponding to the characters "a", "j", and "m" at middle positions equally dividing the "a", "d", "g" . . . and "y" lines. For example, when the area of "j" is touched or pressed as shown in (b) of FIG. 17, the displayed character is changed to the desired character starting from "j". Such a method has an effect on increasing each area to be pressed and allows the operator to easily make a press. Moreover, since it is difficult to know which character line is to be specified when kinds of the character lines ("a", "d", "g" . . . and "y") are allocated to the keys, some of the characters are picked out and allocated to the respective ranges each including a set of a plurality of keys. For example, the characters "a", "j", and "s" are picked out.

In (b) of FIG. 17, the selection starts from keys (a vertical line) corresponding to "j". As described in the first embodiment, when the desired character is not included in the "j" line, the line and rank are determined. When the desired character is included in the "j" line, only the rank is determined. Examples 1, 2, and 3 in (c) of FIG. 17 show processes of changing the displayed character to the desired character starting from "j". Examples 4, 5, and 6 in (d) of FIG. 17 show changes in the rank by vertical movements when the previous horizontal movement ends at "m".

As shown in FIG. 18, to input "o", the line is determined with a horizontal slide operation, and the rank is then determined with a vertical slide operation.

In addition to the method described in FIG. 17, there are various methods of allocating characters and various methods of determining the line and rank of the desired character by the directional characteristic of the slide operation.

Such methods of allocating characters include: (1) a method of allocating characters to respective keys; (2) a method of vertically dividing keys and allocating characters to respective vertically divided keys; and (3) a method of horizontally dividing keys and allocating characters to respective horizontally divided keys.

The methods of determining characters include methods in which: (1) in the case of selecting the line and rank with free movements (specifically, the line and rank are freely determined with movements in arbitrary directions without fixing the determination manner like the way in which the line and rank are determined with the vertical and horizontal movements) and determining the line and rank by a press or touch; (2) in the case of using horizontal and vertical slide movements to determine the line and rank, respectively, the line is instantaneously determined when the horizontal movement changes into the vertical movement without the need for an event to determine the line; and (3) in the case of using horizontal and vertical slide movements to determine the rank and line, respectively, the rank is instantaneously determined when the horizontal movement changes into the vertical movement without the need for an event to determine the rank.

(Effect)

With the terminal according to the second embodiment, the method of controlling the same, and the control program of the same, characters are previously allocated to the respective keys or the respective portions of the key section, and a character allocated to the key or section in which a touch is detected is outputted. Accordingly, the operator can customize the pattern of associating changes of the displayed character to slide movements and the presence of the assignment of the keys to the characters.

<Third Embodiment>

In a third embodiment, in a state where candidates for an output object are being outputted to the output unit, the screen is easily scrolled or switched.

(Terminal Configuration)

As shown in FIG. 5, a terminal according to the third embodiment includes the key input unit 51 having the key section; the output unit 54 outputting information inputted by the key input unit 51; the touch detection unit 50; and the control unit 52.

When the touch detection unit 50 detects a movement of an object by a certain distance in a certain direction in a state where the candidates for the output target are outputted to the output unit 54, the control unit 52 scrolls the candidates for the output target or continuously switches to another output object. The control unit 52 also adjusts speed of scrolling the candidates of the output target or speed of switching to another output object.

The other configuration is the same as the terminal of the first embodiment, and the description thereof is omitted here.

(Terminal Control Method)

Next, a description is given of a method of controlling the terminal according to the third embodiment using FIGS. 19 to 23.

In the terminal according to the third embodiment, when the entire screen is desired to be moved to the next page, the finger keeping the touch is moved a certain distance (for example, by three keys) in a certain direction (for example, downward) to automatically display the next page or shift the screen a little to the next page. FIG. 19 shows a screen listing photo files as an example. In FIG. 19, numbers are the numbers of the photo files. To subsequently stop the aforementioned automatic transition of the screen, any event, for example, such as a touch-off, a press, or a slide in another direction, is made to stop the screen at the target display.

This can be applied to not only the photo files but also everything which can be listed. Examples thereof are selection of pictograms shown in FIG. 20, an address book shown in FIG. 21, switching of characters, kana-kanji predicted conversion candidates, mail inbox folders, and menu screens.

Figure 22:
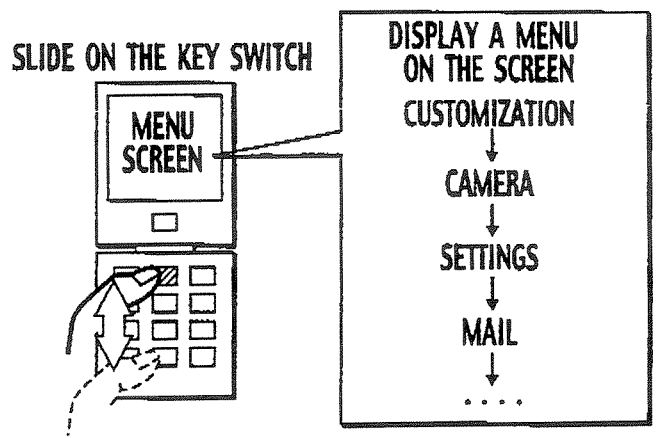
FIG. 22 is a view for explaining the method of controlling the terminal according to the third embodiment.

Moreover, for example as shown in FIG. 22, at menu operation, to display the next page in a screen where a single menu item is displayed, for example, the finger is moved a certain distance (for example, by three keys) in a certain direction (for example, downward) while keeping the touch to automatically display the next page or shift the current page a little to the next page. To subsequently stop the aforementioned automatic transition of the screen, any event, for example, such as a touch-off, a press, or a slide in another direction, is made to stop the screen at the target display.

Figure 23:
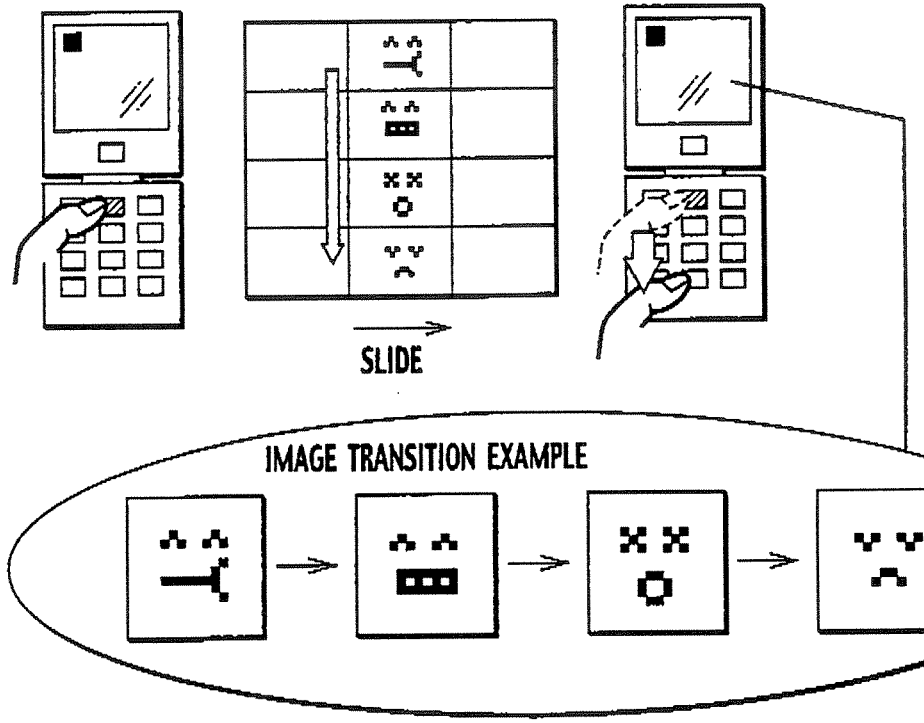
FIG. 23 is a view for explaining the method of controlling the terminal according to the third embodiment.

This can be applied to not only the photo files but also everything singly displayed on the screen. Examples thereof are, in addition to the selection of pictograms shown FIG. 23, an address book, switching of characters, predicted kana-kanji conversion candidates, mail inbox folders, and menu screens. In FIG. 23, pictograms sequentially appear one by one with a touch and a slide. The order of the pictograms appearing is the order of frequency of use, the order in a pictogram list, random, or the like.

Moreover, the speed of switching display when the display is being automatically changed may be adjusted according to the speed of the finger sliding on the keys. For example, the transition speed of the screen is increased as the slide speed increases.

Moreover, FIG. 19 shows a state during the screen transition where the entire display is not replaced while a part of the display remains and a part of a list of the next page is added thereto, that is, a state where the screen is shifted. In such a case, the occupation ratio of the next page (shift ratio) in the screen may depend on the slide speed or slide distance. For example, at a higher slide speed, the screen becomes closer to the next page, that is, the occupation ratio of the next page in the screen becomes higher. Alternatively, for example, when the slide distance is longer, the screen similarly becomes closer to the next page, that is, the occupation ratio of the next page in the screen becomes higher.

(Effect)

With the terminal according to the third embodiment, the method of controlling the same, and the control program of the same, when the touch detection unit 50 detects a movement of an object by a certain distance in a certain direction in a state where the candidates for the output target are being displayed, the candidates for the output target can be scrolled or continuously switched to another output target. The input operation can be therefore further facilitated.

Moreover, the control unit 52 can adjust the speed of scrolling the candidates of the output target or the speed of switching to another output target according to the moving speed of the object. The input operation can be therefore further facilitated.

Moreover, in the screen transition by a slide, the entire display is not replaced while a part thereof remains, and a part of the next page is added thereto, that is, the screen is shifted. The occupation ratio of the next page in the screen (shift ratio) may be configured to depend on the slide speed or slide distance. Accordingly, switching the screen can be easily controlled according to the slide speed or slide distance.

<Fourth Embodiment>

In a fourth embodiment, when a character is inputted, the character is not instantly determined even when a touch-off is made, and the state in the middle of selecting the character is maintained.

(Terminal Configuration)

As shown in FIG. 5, a terminal according to the fourth embodiment includes the key input unit 51 having the key section; the output unit 54 outputting information inputted by the key input unit 51; the touch detection unit 50; and the control unit 52.

Even when the touch detection unit 50 detects a touch-off, the control unit 52 maintains the current selecting state, and when an object again touches the key display area, the control unit 52 again performs the selection operation by an object's movement starting from the selecting state.

The other configuration is the same as the terminal according to that of the first embodiment, and the description is omitted here.

(Terminal Control Method)

Figure 24:
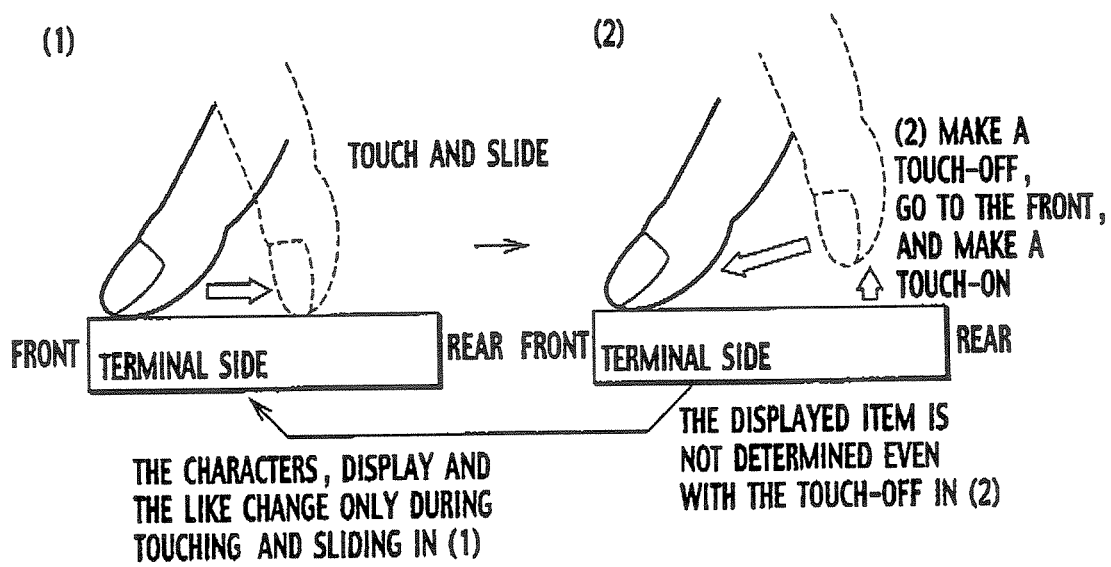
FIG. 24 is a view for explaining a method of controlling a terminal according to a fourth embodiment.

In the fourth embodiment, the display changes, for example, only when the finger vertically slides on the keys from the front to the rear ((1) of FIG. 24). Furthermore, a touch-off of the finger located at the rear is made, and then the finger is moved to the front without touching the key section surface ((2) of FIG. 24). The finger again slides on the keys from the front to the rear ((1) of FIG. 24). Such operations are repeated several times to switch candidates for the input character.

(Effect)

With the terminal according to the fourth embodiment, the method of controlling the same, and the control program of the same, in repeatedly switching the display with a short distance, characters can be quickly switched by the following a to d:

a. switch characters (or display) with a slide from the front to the rear
b. maintain the selecting state even when the finger is separated from the touch detection area (a touch-off is made)
c. start from the selecting state when the finger again touches another key
d. again to a The above example is an example of sliding the finger while keeping the touch from the front to the rear. However, the finger may slide from the rear to the front, right to left, or left to right.

<Fifth Ebodiment>

In a fifth embodiment, while a characters is inputted by slide operations, a "return" operation (to display characters in the reverse order) or a "clear" operation (to cancel) is carried out by a slide in a direction opposite to the previous slide.

(Terminal Configuration)

As shown in FIG. 5, a terminal according to the fifth embodiment includes the key input unit 51 having the key section; the output unit 54 outputting information inputted by the key input unit 51; the touch detection unit 50; and the control unit 52.

When the touch detection unit 50 detects a movement of an object and then detects a movement of the object in an opposite direction, the control unit 52 reverses the order of display or clears the current display.

The other configuration is the same as that of the terminal according to the first embodiment, and the description thereof is omitted here.

(Terminal Control Method)

Figure 25:
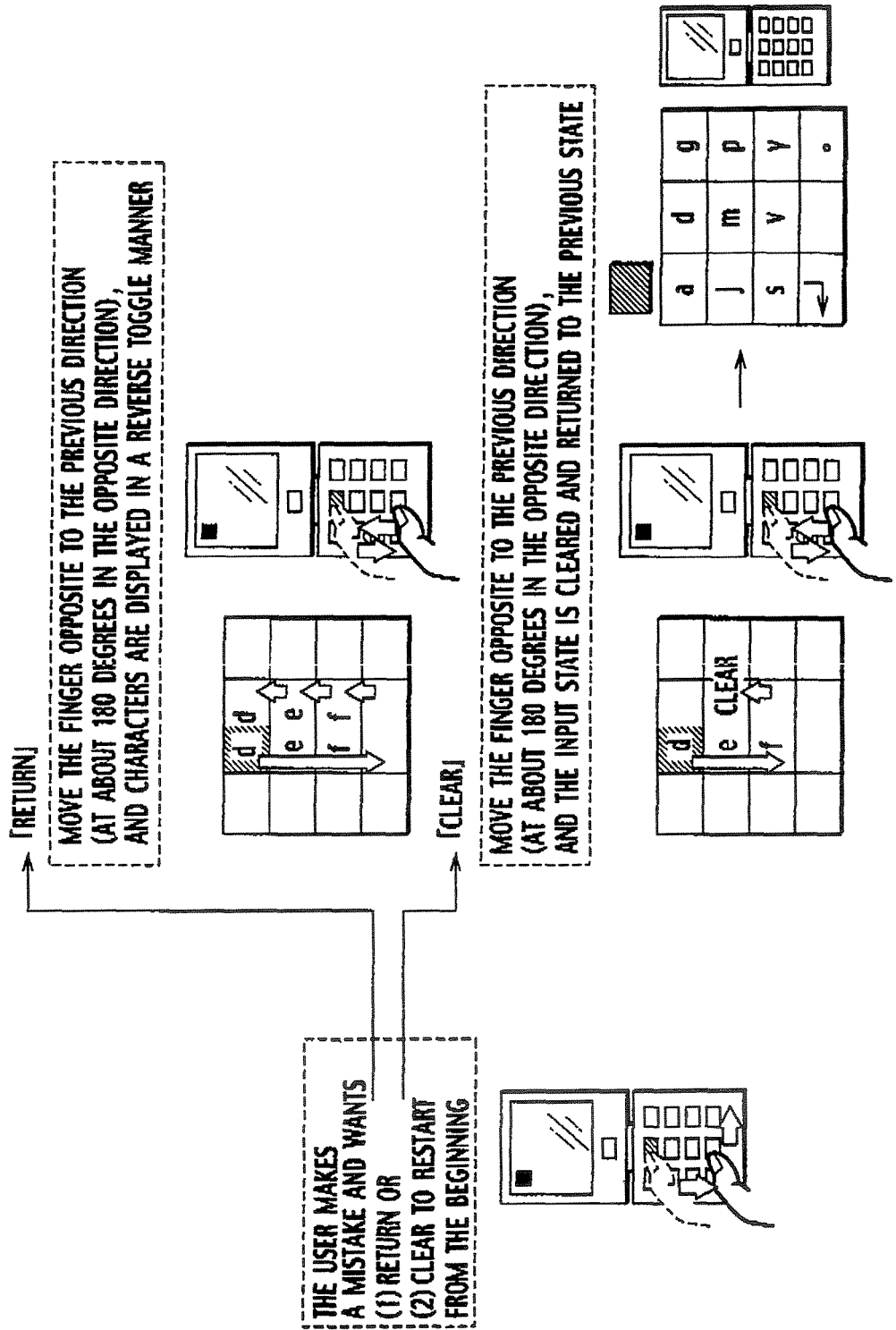
FIG. 25 is a view for explaining a method of controlling a terminal according to a fifth embodiment.

In the fifth embodiment, as shown in FIG. 25, when characters are selected by the slide operation, the finger is slid in an opposite direction to the previous slide to perform the "return" operation. For example, as shown in FIG. 25, when a downward slide is made to sequentially display "d", and "e", if the slide is further made, "f" is displayed next. But, when the finger is slid at 180 degrees in the opposite direction (upward in this case) at the stage of "f", the displayed character is returned to like "f", "e" and "d".

This embodiment can be thought applicable to not only inputting characters but also everything having an order. An example thereof can be a case of returning to the previous display screen in selection of characters, selection of kana-kanji predicted conversion candidates, selection of pictograms, an address book, photo folders, mail inbox folders, switching of menu screens, and the like.

There is another case where the slide in the opposite direction to the previous slide serves as not the "return" operation but the "clear" operation. For example, as shown in FIG. 25, when the display reaches "f" and the "f" is desired to be cleared, the finger is slid from the top to the bottom to sequentially display "d", "e" and "f" and then slid in the opposite direction (from the bottom to the top in this case) to replace "f" with a space. This embodiment also may be thought applicable to not only inputting characters but also everything having an order. An example thereof can be a case of making "clear" to return to the initial display screen in selection of characters, selection of kana-kanji predicted conversion candidates, selection of pictograms, an address book, photo folders, mail inbox folders, switching of menu screens, and the like.

(Effect)

With the terminal according to the fifth embodiment, the method of controlling the same, and the control program of the same, the "return" and "clear" operations can be easily performed by a slide in the opposite direction to the previous slide.

Specifically, when the "e" is intended to be inputted but the key is pressed excessively once to reach "f", the operator needs to press the key again from the beginning to sequentially display "f", "d", and "e" or press any "return button" to return from "f" to "e". Accordingly, the display cannot be returned to the previous screen, which is inconvenient. In this embodiment, the display can be returned very easily only by the slide in the opposite direction to the previous slide.

This embodiment also saves the operator the trouble of pressing the "clear" button, and the operator can easily perform the clear operation.

<Sixth Embodiment>

In a sixth embodiment, a description is given of a layer transfer function by a touch-off and a layer transfer function by a minute slide.

(Terminal Configuration)

As shown in FIG. 5, a terminal according to the sixth embodiment includes the key input unit 51 having the key section; the output unit 54 outputting information inputted by the key input unit 51; the touch detection unit 50; and the control unit 52.

When the touch detection unit 50 detects a touch-off or a movement of an object in a particular portion of the key section, the control unit 52 switches the display from the state where the output target is being selected to a next layer or next output candidates.

The other configuration is the same as that of the first embodiment, and the description thereof is omitted herein.

(Terminal Control Method)

The terminal according to the sixth embodiment includes a function to proceed to the next layer by a touch-off in a state where a display target is being selected. For example, in the menu screen shown in (1) of FIG. 26 whose menu structure is tree type, such proceeding to the next layer is a process of proceeding to a lower layer to reach the target item. For example, in a state where the touch is being maintained, when a touch-off is made at a place to be selected in the menu screen (where a cursor or the like is located) the next layer is displayed. In (2)-a of FIG. 26, the menu proceeds to the next layer by a touch-off, and then photo files are switched and displayed by a slide for selection. In (2)-b of FIG. 26, the menu proceeds to the next layer by a touch-off, and a photo file is selected by a press from a displayed list instead of by a slide. In (2)-c of FIG. 26, the menu proceeds to the next layer by press, and then photo files are switched and displayed for selection by the slide.

Figure 27:
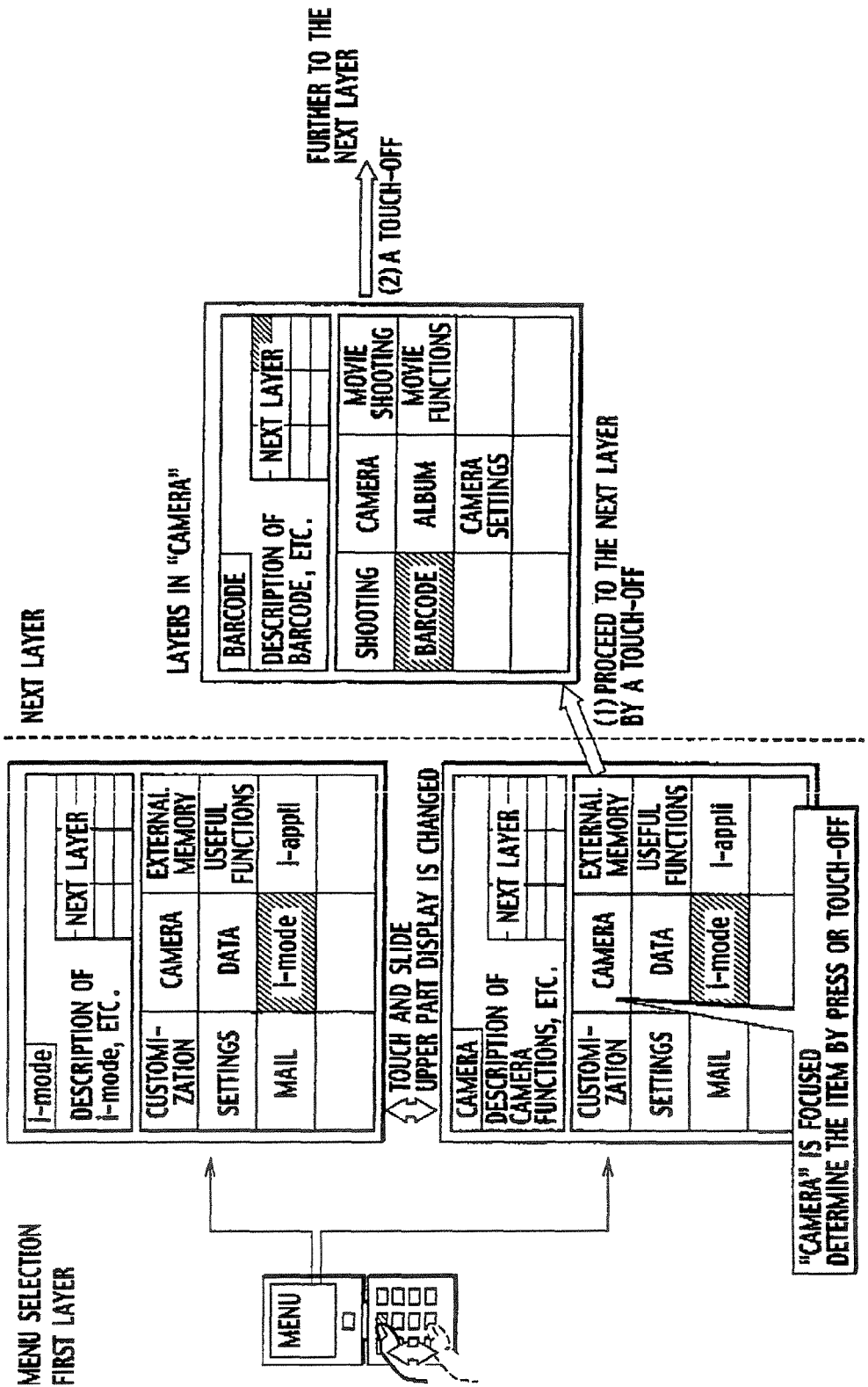
FIG. 27 is a view for explaining the method of controlling the terminal according to the sixth embodiment.

This embodiment may be thought to be applicable to not only the menu or the like with a tree structure but also everything having an order. An example thereof can be a case of proceeding to the next layer (or next display candidates, etc.) by a touch-off in selecting characters, selecting kana-kanji prediction conversion candidates, selecting pictograms, an address book, photo folders, mail inbox folders, switching menu screens (see FIG. 27), and the like.

The aforementioned means of proceeding to the next layer may be, not the "touch-off", but "a minute slide" within a same key or a certain range including a certain key.

(Effect)

With the terminal according to the sixth embodiment, the method of controlling the same, and the control program of the same, the display can be easily switched.

<Seventh Embodiment>

In a seventh embodiment, a description is given of a terminal including a function to, based on the current outputted display of the output unit, output another display related to the current display to the output unit as the switch candidates or to switch the input mode to the conversion mode when two-point touch is detected.

(Terminal Configuration)

Figure 28:
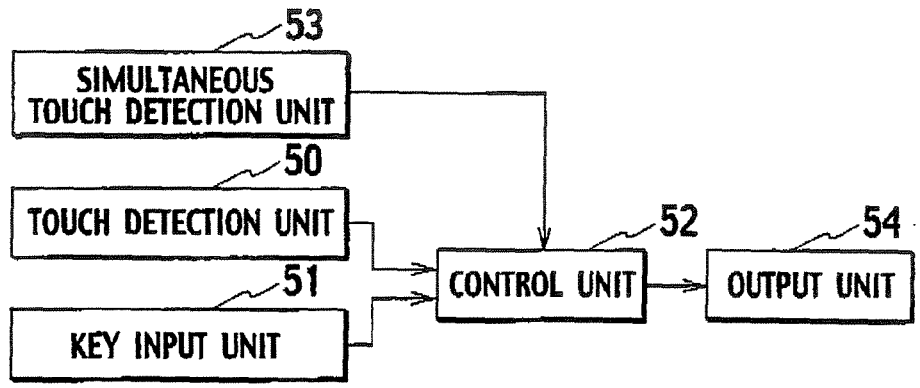
FIG. 28 is a block diagram of a terminal according to a seventh embodiment.

As shown in FIG. 28, a terminal according to the seventh embodiment includes the key input unit 51 having the key section; the output unit 54 outputting information inputted by the key input unit 51; the touch detection unit 50; the control unit 52; and a simultaneous touch detection unit 53.

The simultaneous touch detection unit 53 detects that an object simultaneously touches two points in the key section and notifies the control unit 52 of a detection value.

Based on the current output display of the display unit, the control unit 52 outputs another display related to the display to the output unit 54 as the switch candidate. For example, when "a" is displayed, the control unit 52 predicts words such as "able", "act", and "add" and displays the same to the output unit 54.

Moreover, when the simultaneous touch detection unit 53 detects a two-point touch, the control unit 52 switches the mode from the input mode to the conversion mode.

Moreover, when any one of touched positions of the first and second pressing member slides to the adjacent key after the mode is switched to the "conversion mode", upon detection of the touch to the adjacent key, the control unit 52 switches the conversion candidate of the "conversion mode". Furthermore, upon detection of a touch to another adjacent key, the control unit 52 sequentially switches the conversion candidate continuously and then fixes the selected conversion candidate by a touch-off, a press, a slide within a same key, or a slide in a particular range.

Moreover, in inputting characters, the control unit 52 may switch the mode from the "input mode" to the "conversion mode" when it is detected that the touch state of an object in contact with the key surface, such as the finger or another pressing member, becomes the touch-off state.

Moreover, in inputting characters, the control unit 52 may switch the mode from the "input mode" to the "conversion mode" when it is detected that an object in contact with the key section surface, such as the finger or another pressing member, slides within a range of a same key or a specific range.

Alternatively, the control unit 52 may be configured to switch the mode from the "input mode" to the "conversion mode" when characters are inputted in the following manner. The detection section of the touch detection unit 50 is divided into a plurality of particular ranges (upper and lower ranges, right and left ranges, inner or outer ranges, or the like). When it is detected that the finger or another pressing member slides from one of the ranges in contact with the key section surface and touches another one thereof, the "input mode" is switched to the "conversion mode".

The other configuration is the same as that of the terminal according to the first embodiment, and a description thereof is omitted herein.

(Terminal Control Method)

Figure 29:
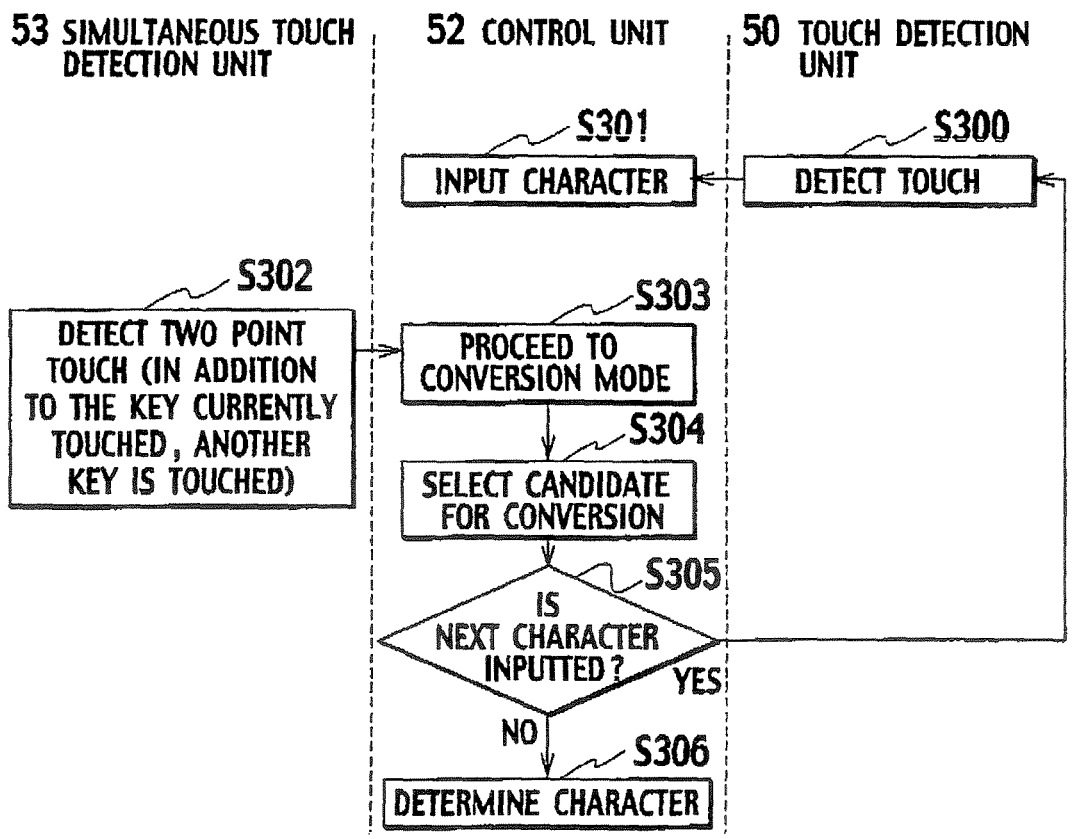
FIG. 29 is a flowchart showing a method of controlling the terminal according to the seventh embodiment.

Next, a description is given of a method of controlling the terminal according to the seventh embodiment using FIG. 29.

For example, upon detection of a touch to one point (simultaneous two-point touch) (S302) while a touch to another point is being maintained (S300) in the character input mode (S301), the input mode proceeds to the conversion mode (S303). In other words, the simultaneous touch is an event for switching to the conversion mode.

Figure 30:
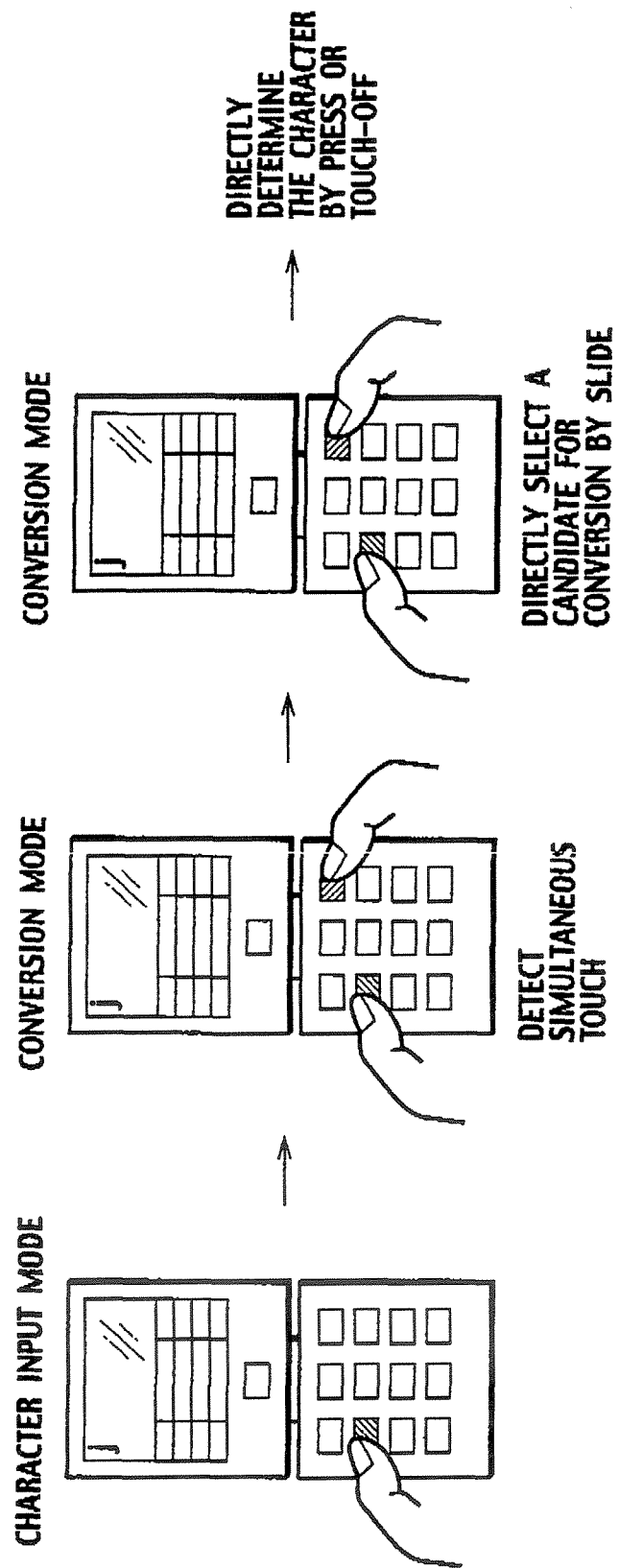
FIG. 30 is a view for explaining the method of controlling the terminal according to the seventh embodiment.

After the mode becomes the conversion mode, a conversion candidate is directly selected (S304) for selection of a target word. The way of selection is not particularly limited but may be, for example, a method of switching the display candidate by the slide operation. When the selection is terminated, a press or touch-off is made for determination (S306). To input a next character (S305), the terminal is returned to the "touch detected state" (S300). Such a flow to input characters is shown in FIG. 30.

Figure 31:
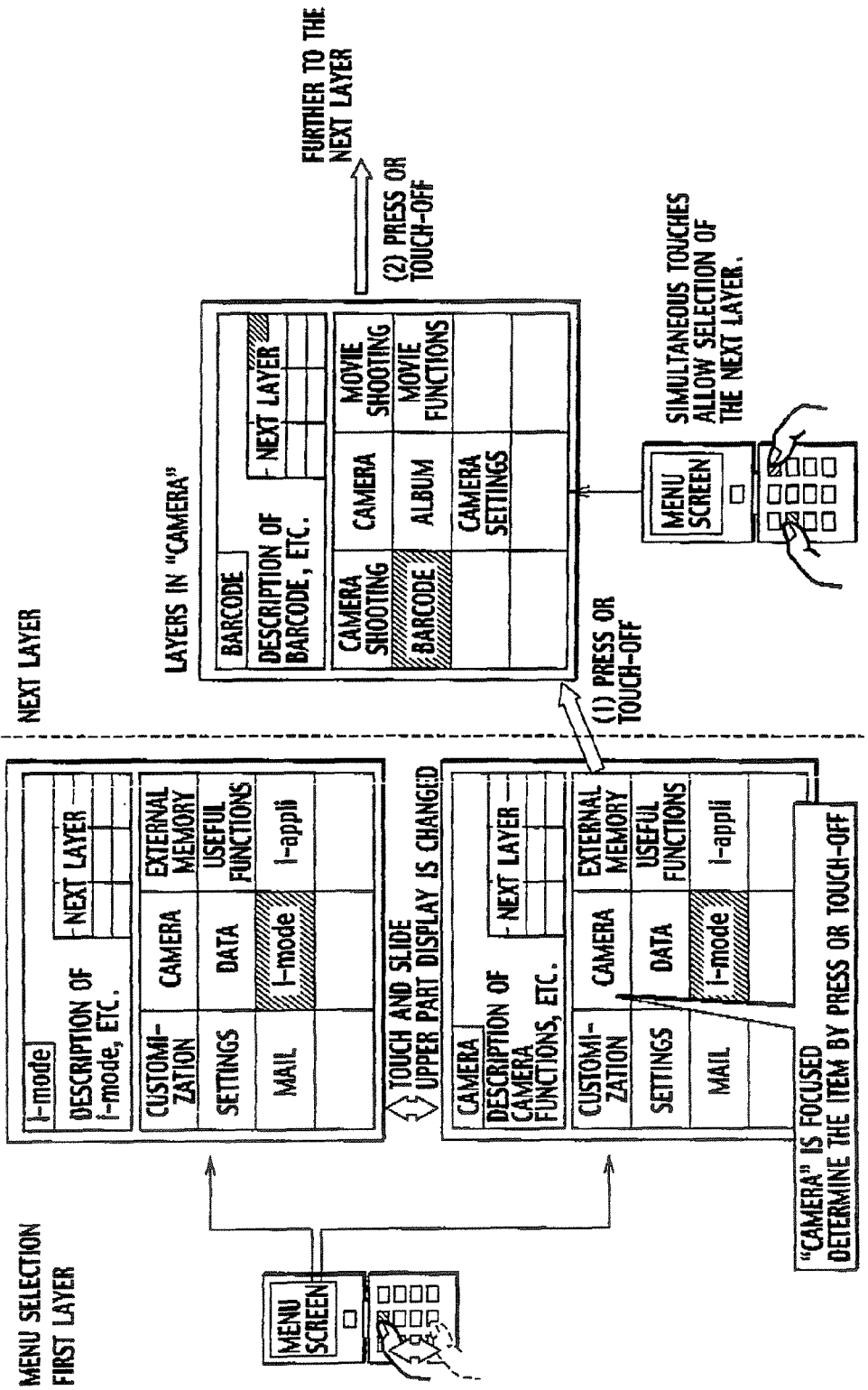
FIG. 31 is a view for explaining the method of controlling the terminal according to the seventh embodiment.

The simultaneous touch detection function described in the seventh embodiment can be combined with the layer transfer by a touch-off described in the sixth embodiment. This operation method is shown in FIG. 31.

Figure 32:
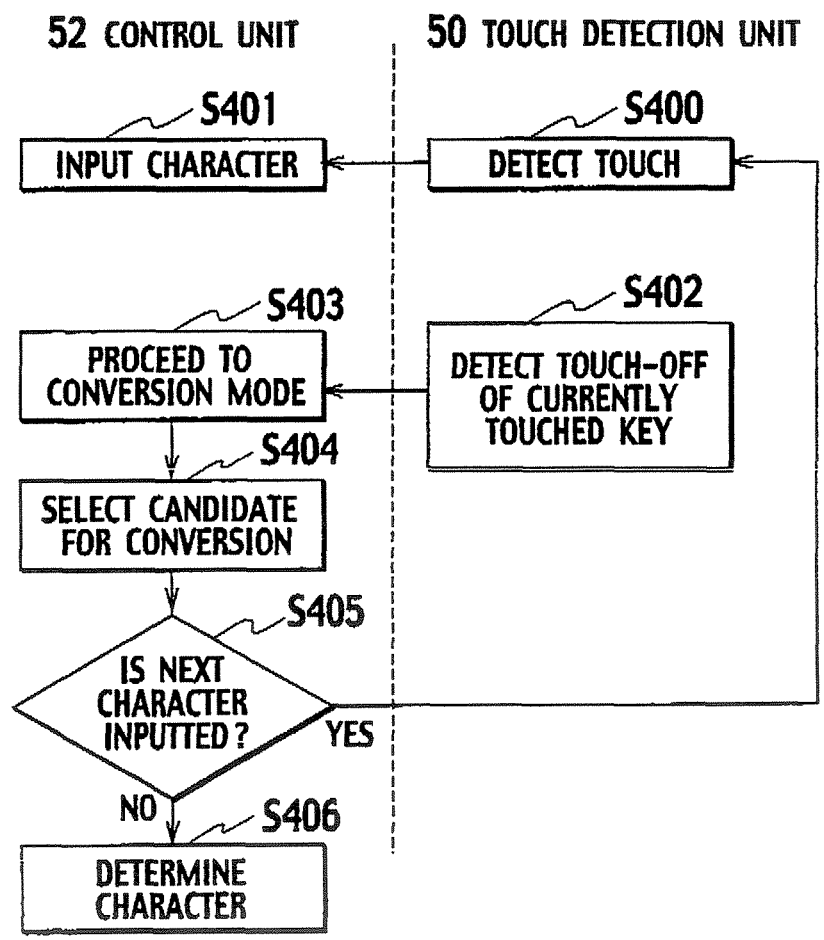
FIG. 32 is a flowchart showing the method of controlling the terminal according to the seventh embodiment.
Figure 33:
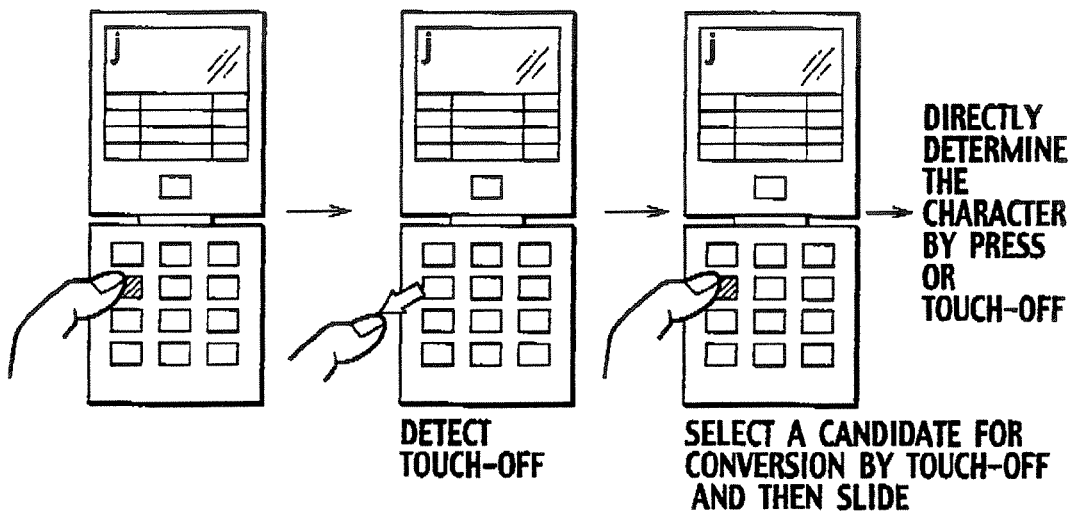
FIG. 33 is a view for explaining the method of controlling the terminal according to the seventh embodiment.

Next, using FIG. 32, a description is given of a method of switching the mode from the character input mode to the conversion mode by a touch-off when characters are inputted in the method of controlling the terminal according to the seventh embodiment.

This method is basically the same as that shown in FIG. 29, and a different point is that the mode is switched upon detection of the simultaneous touch in FIG. 29 while the mode is switched upon detection of a touch-off of the finger.

For example, upon detection of a touch-off (S402) while a touch to another point is being maintained (S400) in the character input mode (S401), the input mode proceeds to the conversion mode (S403). In other words, the touch-off is an event for switching to the conversion mode. After the mode becomes the conversion mode, a conversion candidate is selected (S404) for selection of a target word. The way of selection is not particularly limited but may be, for example, a method of switching the displayed candidate by the slide operation. When the selection is terminated, a press or touch-off is made for determination (S406). Such a flow to input characters is Herein, in the case of selecting the conversion candidate by the slide operation after the simultaneous touch is detected to switch the mode to the conversion mode, the conversion candidate may be selected by slide of the finger having touched first among the fingers simultaneously touching two points or by slide of the finger having touched later. Normally, the selection of the conversion candidate by the slide of the finger having touched later has higher effect since it is thought that the finger having touched first has already performed inputting characters.

Figure 34:
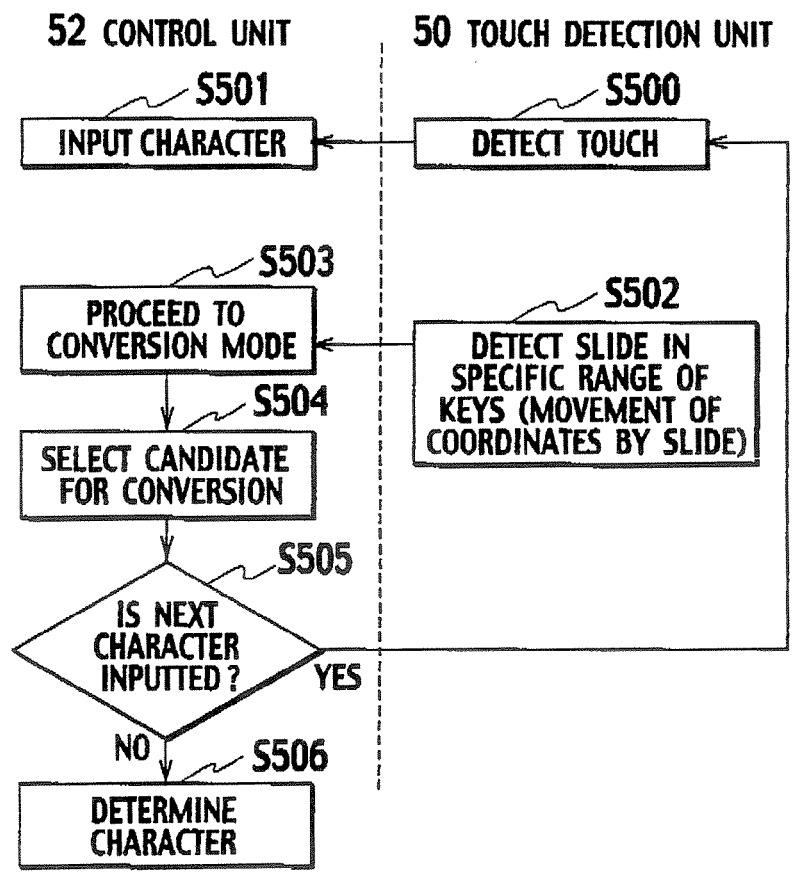
FIG. 34 is a flowchart showing the method of controlling the terminal according to the seventh embodiment.

Next, using FIG. 34, a description is given of a method of switching the mode from the "input mode" to the "conversion mode" by a minute slide within a same key or a particular range in the input mode when characters are inputted in the method of controlling the terminal according to the seventh embodiment.

This method is basically the same as that shown in FIG. 29, and a different point there between is that the mode is switched upon detection of the simultaneous touch in FIG. 29 while the mode is switched upon detection of a "slide" (an extremely small slide herein) of the finger whose touch has been detected within a particular range.

Figure 35:
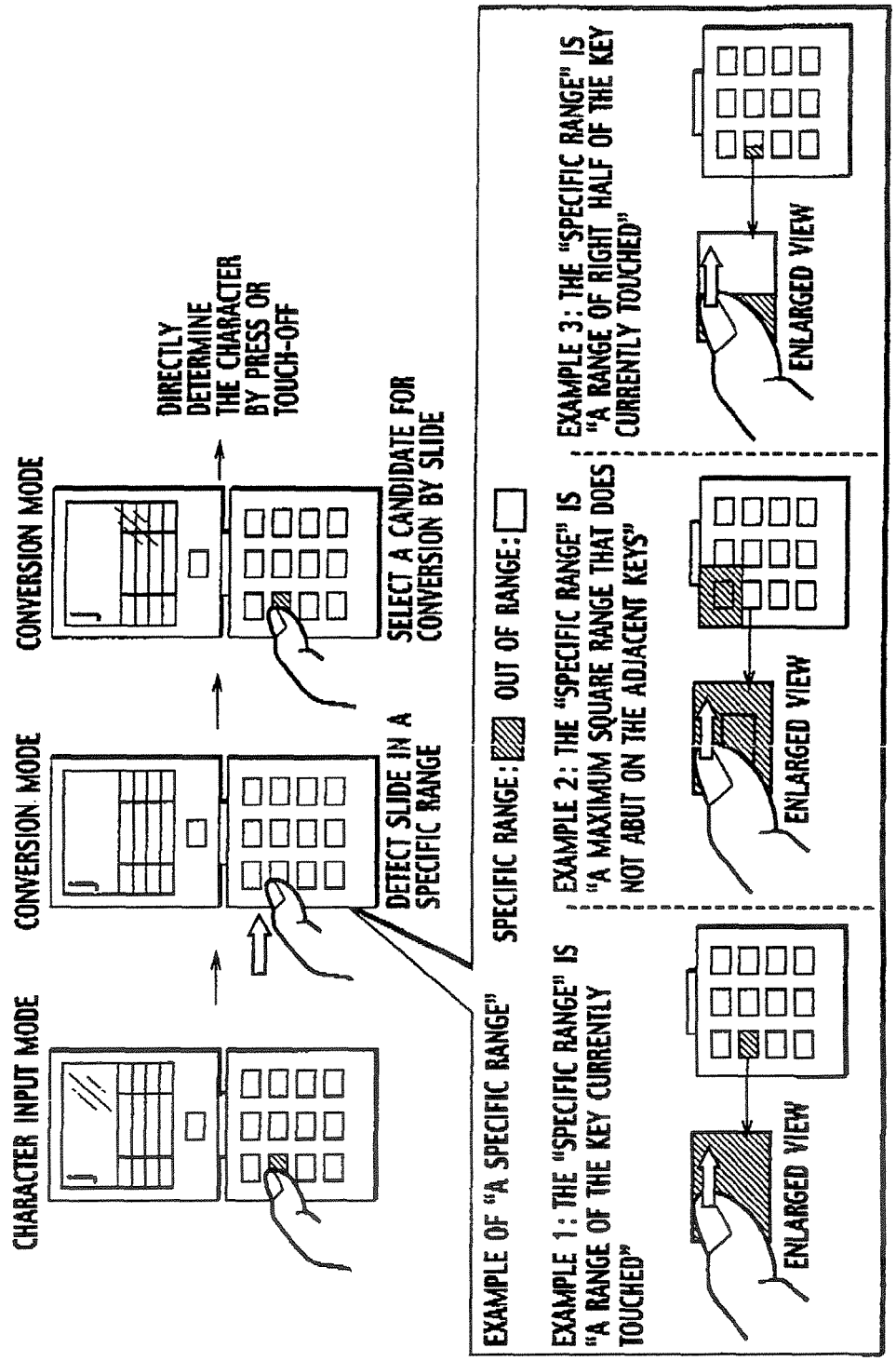
FIG. 35 is a view for explaining the method of controlling the terminal according to the seventh embodiment.
Figure 36:
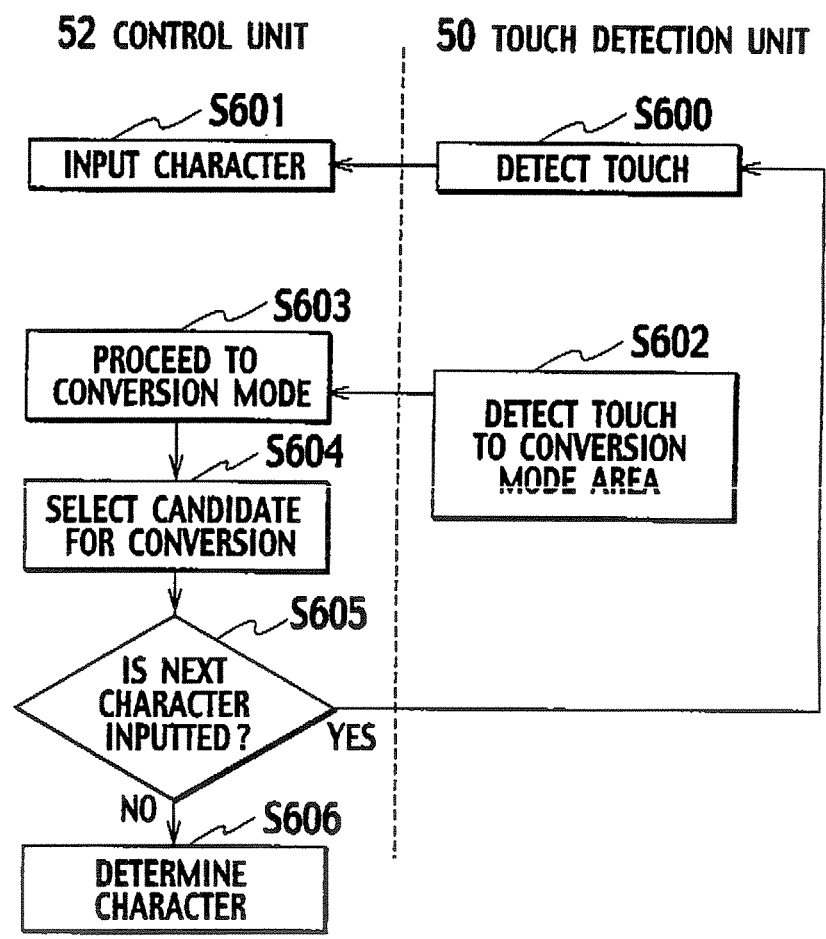
FIG. 36 is a flowchart showing the method of controlling the terminal according to the seventh embodiment.

For example, upon detection of a slide within a particular range (S502) while a touch to a point is being maintained (S500) in the character input mode (S501), the mode proceeds to the conversion mode (S503). In other words, the slide within a particular range is an event for switching to the conversion mode. After the mode proceeds to the conversion mode, a conversion candidate is selected (S504) to select a target word. The way of selection is not particularly limited herein but may be, for example, a method of switching the displayed candidate by the slide operation. When the selection is terminates, a press or touch-off is made for determination (S506). Such a flow to input characters is shown in FIG. 35. Some examples of the aforementioned "a certain particular range" are shown in FIG. 35. In addition to Examples (1), (2), and (3), other various patterns can be thought. However, it is desirable that the "particular range" is not excessively wide since a slide within a minute range is preferable in practical use.

Figure 26:
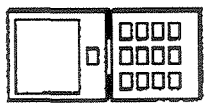
FIG. 26 is a view for explaining a method of controlling a terminal according to a sixth embodiment.

Next, using FIG. 26, a description is given of a method of dividing the detection region of the touch detection unit 50 into upper and lower ranges, right and left ranges, inner or outer ranges, or the like and assigning the two ranges to the character input mode and conversion mode when characters are inputted in the method of controlling the terminal according to the seventh embodiment. For example, in the character input mode, the range of the character input mode is touched to input characters, and the mode is switched from the "character input mode" to the "conversion mode" upon detection of a touch to the range of the conversion mode.

This method is basically the same as that shown in FIG. 29, and a different point there between is that the mode is switched upon detection of the simultaneous touch in FIG. 29 while the mode is switched upon detection of a touch to the range of the conversion mode when characters are inputted in the character input mode.

For example, upon detection of a touch to a range of the conversion mode (S602) in a state where a range of the character input mode is being touched in the character input mode (S601), the mode proceeds to the conversion mode (S603). In other words, the touch to the range of the conversion mode is an event for switching to the conversion mode. After the mode proceeds to the conversion mode, a conversion candidate is selected (S604) for selection of a target word. The way of selection is not particularly limited herein but may be, for example, a method of switching the display candidate by the slide operation. When the selection is terminated, a press or touch-off is made for determination (S606). Such a flow to input characters is shown in FIG. 37.

In the range of the character input mode, characters can be inputted, and upon entry to the range of the conversion mode (upon detection of the touch to the range of the conversion mode), the mode is automatically switched to the conversion mode. Herein, as the method of inputting characters in the case where the detection range of the touch detection unit 50 is divided into two ranges, the method of inputting characters by the slide operation is applicable (see Example 1 of FIG. 37) since the number of keys is less than the normal numeric keyboard of a mobile terminal. Moreover, in order to perform only switching the mode by the aforementioned method of this embodiment while performing inputting characters by the normal 5-touch mode, the terminal can be configured so that the mode is automatically switched from the input mode to the conversion mode upon a touch to a particular range where the numeric keyboard is not included and is less likely to be accidentally touched (see Example 2 of FIG. 37). Alternatively, the hardware configuration may be modified to increase the number of keys, and the same number of keys as that of the normal numeric keyboard of the mobile terminal are disposed (see Example 3 of FIG. 37). This allows the normal 5-touch mode instead of the method of inputting characters by the slide operation.

(Effect)

With the terminal according to the seventh embodiment, a method of controlling the same, and control program of the terminal, the simultaneous touch serves as the event of switching to the conversion mode. This eliminates the need to press a conversion button, which needs to be pressed to convert a character, thus shortening the input time. Moreover, the conversion candidate can be selected and directly determined by the slide operation continuously performed after the mode switch by the simultaneous touch. It is therefore possible to smoothly perform the flow of the series of operations: inputting a character -> switching to the conversion mode -> selecting a conversion candidate -> determining selected candidate. This is because the slide or touch to the range of the conversion mode is an operationally simple event, thus allowing the mode to quickly proceed to the conversion mode. Moreover, even after the transfer to the range of the conversion mode, the conversion candidate can be continuously selected directly.

The aforementioned "directly determined" means that the character selected by the slide operation can be directly determined. For example, after a conversion candidate is selected with a particular conversion key (for example, a space key of PCs and a conversion key of normal mobile phones), to determine the selected candidate, it is necessary to move the finger to another key. For example, PCs require moving to the ENTER key after the space key (conversion key) is pressed. On the other hand, in this embodiment, since the touch pad and the keys are overlapped on each other, the determination can be made by a press or touch-off without a movement to another key. Accordingly, the input speed is increased by one step. Moreover, the simultaneous touch does not require pressing a particular conversion key (for example, a space key of PCs and a conversion key of normal mobile phones) but just requires touching any one of the keys to bring the mode into the conversion mode. Accordingly, there is no need to search for the single conversion key. Moreover, the number of key presses is reduced. Furthermore, the conversion key is unnecessary, so that the terminal has a larger space. In the operation by the simultaneous touch, the operator does not get confused because his/her both hands can share the functions. For example, the left hand performs inputting characters while the right hand performs selecting a conversion candidate. In the normal mobile terminal, inputting characters and selecting a conversion candidate are performed by the same hand, and the operator is more likely to be confused.

This mode switching method can be applied to everything related to conversion of display in addition to conversion of characters such as prediction conversion, kana-kanji conversion, and other conversion of characters by a dictionary function. In an example other than the conversion related to characters, upon detection of the simultaneous touch while a menu is being displayed, a similar menu related to the above menu or a menu often used is displayed as a candidate for a next display. Alternatively, upon detection of a simultaneous touch while a photo file is displayed, a photo taken in same hours or a photo whose number is close to the previous photo file is displayed as the next display candidate.

What is claimed is:

1. A terminal including a key input unit having a key section and an output unit outputting information inputted by the key input unit, the terminal comprising:
  a touch detection unit which detects a touch of an object to the key section and calculates a moving distance that the object has moved on a surface of the key section while keeping the touch, the key section includes a plurality of keys; and
  a control unit which switches information outputted to the output unit according to the moving distance calculated by the touch detection unit,
  wherein
  the control unit is configured to perform a first selection process for switching a representative character of respective group of characters to be displayed indicating the respective group of characters as a selection candidate, in accordance with the calculated moving distance,
  after detecting that the representative character has been selected in the first selection process, the control unit is configured to perform a second selection process for switching a respective one of the individual characters to be displayed indicating the respective one of the individual characters as a selection candidate, in accordance with the calculated moving distance,
  the control unit is configured to detect a selection of one of the individual characters,
  in both the first selection process and the second selection process, the control unit sets a touch to a key adjacent to the touched key as an event to display a next selection candidate, and
  in the first selection process, a common initial representative character is commonly assigned to the plurality of keys, the common initial representative character being the representative character to be displayed upon the detection of initial touch to any one of the plurality of keys.

2. The terminal according to claim 1, wherein
the control unit detects that the representative character has been selected, upon detecting that a moving direction of the object is changed from a horizontal direction to a vertical direction or detecting that the moving direction of the object is changed from the vertical direction to the horizontal direction.

3. The terminal according to claim 1, wherein
according to moving speed of the object, the control unit adjusts switching speed of the selection candidate.

4. The terminal according to claim 1, wherein
the control unit maintains a selected state even when the touch detection unit detects a touch-off and then again performs a selection operation by a movement of the object from the selected state when the touch detection unit detects that the object again touches the key section.

5. The terminal according to claim 1, wherein
the control unit detects the selection of one of the individual characters, when the moving direction changes to the opposite direction.

6. A non-transitory computer readable medium encoded with instructions which, when executed by a processor, cause the processor to execute a method on a terminal including a key input unit having a key section including a plurality of keys and an output unit outputting information inputted by the key input unit, said method comprising:
  detecting a touch of an object to the key section and calculating a moving distance that the object has moved on a surface of the key section while keeping the touch;
  switching information outputted to the output unit according to the distance calculated in the detecting and calculating step;
  performing a first selection process for switching a representative character of respective group of characters to be displayed indicating the respective group of characters as a selection candidate, in accordance with the calculated moving distance;
  after detecting that the representative character has been selected in the first selection process, performing a second selection process for switching a respective one of the individual characters to be displayed indicating the respective one of the individual characters as a selection candidate, in accordance with the calculated moving distance, and detecting a selection of one of the individual characters,
  in both the first selection process and the second selection process, the switching sets a touch to a key adjacent to the touched key as an event to display a next selection candidate, and
  in the first selection process, a common initial representative character is commonly assigned to the plurality of keys, the common initial representative character being the representative character to be displayed upon the detection of initial touch to any one of the plurality of keys.

7. The terminal according to claim 1, wherein the key section is a key switch having buttons, and the touch detection unit calculates the distance that the object has moved based on a number of buttons that the object has moved across while keeping the touch.

* * * * *